US012634713B2

(12) United States Patent
Kim et al.

(10) Patent No.: US 12,634,713 B2
(45) Date of Patent: May 19, 2026

(54) APPARATUS AND METHOD FOR PERFORMING BEAM SELECTION IN COMMUNICATION SYSTEM FOR SUPPORTING SATELLITE NETWORKS

(71) Applicant: AJOU UNIVERSITY INDUSTRY-ACADEMIC COOPERATION FOUNDATION, Suwon-si (KR)

(72) Inventors: Jae-Hyun Kim, Seoul (KR); Wonjae Shin, Seoul (KR); Sangmin Han, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 312 days.

(21) Appl. No.: 18/474,482

(22) Filed: Sep. 26, 2023

(65) Prior Publication Data

US 2024/0397340 A1 Nov. 28, 2024

(30) Foreign Application Priority Data

Nov. 25, 2022 (KR) ......................... 10-2022-0160442
May 26, 2023 (KR) ......................... 10-2023-0068270

(51) Int. Cl.
*H04W 16/28* (2009.01)
*H04W 64/00* (2009.01)
*H04W 84/06* (2009.01)
(52) U.S. Cl.
CPC ......... *H04W 16/28* (2013.01); *H04W 64/006* (2013.01); *H04W 84/06* (2013.01)

(58) Field of Classification Search
CPC ... H04W 16/28; H04W 64/006; H04W 84/06; H04W 48/10; H04W 72/04; H04W 74/08; H04B 7/185; H04L 27/26
See application file for complete search history.

(56) References Cited

U.S. PATENT DOCUMENTS

2022/0046504 A1 2/2022 Shrestha et al.
2022/0109959 A1* 4/2022 Shrestha .................. G01S 3/14
(Continued)

FOREIGN PATENT DOCUMENTS

CN 109120561 A 1/2019
CN 112887015 A 6/2021
(Continued)

OTHER PUBLICATIONS

Sang min Han, et al., "A Novel Beam Design and Performance Analysis of LEO Satellite Networks Robust to Doppler Effects," The Journal of Korean Institute of Communication and Information Sciences '22-12 vol. 47 No. 12, pp. 2033-2046, Dec. 31, 2022.
(Continued)

*Primary Examiner* — Siu M Lee

(57) ABSTRACT

Disclosed herein is beam selection in a system supporting satellite communication. A method of performing beam selection of a user equipment (UE) in a communication system supporting satellite communication may include receiving first information about an elevation angle for supporting the satellite communication and second information about a beam center, determining coverage of a beam based on the first information and the second information, determining a distance between the UE and the beam center based on the second information, and selecting a serving beam for the UE based on the coverage of the beam and the distance.

19 Claims, 32 Drawing Sheets

(56) References Cited

U.S. PATENT DOCUMENTS

| | | | |
|---|---|---|---|
| 2022/0353837 A1* | 11/2022 | Hosseinian | H04W 56/007 |
| 2022/0368401 A1* | 11/2022 | Yang | H04W 56/0035 |
| 2023/0179294 A1* | 6/2023 | Kuang | H04B 7/18541 |
| | | | 370/316 |
| 2023/0370154 A1* | 11/2023 | Ciochina | H04B 7/18539 |
| 2024/0163688 A1* | 5/2024 | Tsai | H04B 7/18541 |

FOREIGN PATENT DOCUMENTS

| | | | |
|---|---|---|---|
| CN | 114339999 A | 4/2022 | |
| CN | 114885287 A | 8/2022 | |
| CN | 114007182 B | 9/2022 | |
| CN | 112821941 B | 10/2022 | |
| JP | H09116479 A | 5/1997 | |
| KR | 10-2014-0038356 A | 3/2014 | |
| KR | 1020180096242 A | 8/2018 | |
| KR | 10-2020-0127865 A | 11/2020 | |
| KR | 10-2023-0035252 A | 3/2023 | |
| WO | 2021219283 A1 | 11/2021 | |

OTHER PUBLICATIONS

Sangmin Han, et al., "Adaptive Beam Size Design for LEO Satellite Networks with Doppler Shift Compensation," 2022 IEEE VTS Asia Pacific Wireless Communications Symposium (APWCS), Aug. 24-26, 2022.

Sangmin Han, et al., "Beam Size Design for LEO Satellite Networks with Doppler Shift Characteristics," 13th International Conference on ICT Convergence (ICTC) 2022, Oct. 20, 2022.

Sang min Han, et al., "A Novel Beam Design and Performance Analysis of LEO Satellite Networks Robust to Doppler Effects," Journal of Korean Institute of Communication and Information Sciences (JKICS) Dec. 15, 2022.

Oltjon Kodheli, et al., "Integration of Satellites in 5G through LEO Constellations," IEEE Global Communications Conference (Globecom) 2017, Jun. 30, 2017.

"[POST111e][910][NTN] Impacts of earth fixed and moving beams (Ericsson)," 3GPP TSG-RAN WG2 Meeting #112, Tdoc R2-2009820.

"Discussion on the remaining issue of enhanced spatial coverage prediction," 3GPP TSG-RAN WG2 Meeting #118 electronic Online, May 9-20, 2022, R2-2204753.

"WF for cell reselection in NTN," 3GPP TSG WG2 #113b-e Electronic Meeting, Apr. 12-20, 2021, R2-2103631.

* cited by examiner

< Beam upper bound in FR1 & $\Theta_{min}$= 10°>

< Beam upper bound in FR1 & $\Theta_{min}$= 25°>

< Beam upper bound in FR2 & $\Theta_{min}$= 10°>

< Beam upper bound in FR2 & $\Theta_{min}$= 25°>

APPARATUS AND METHOD FOR PERFORMING BEAM SELECTION IN COMMUNICATION SYSTEM FOR SUPPORTING SATELLITE NETWORKS

CROSS REFERENCE TO RELATED APPLICATION

The present application claims priority to Korean Patent Application Nos. 10-2022-0160442 filed on Nov. 25, 2022 and 10-2023-0068270 filed May 26, 2023, the entire contents of which is incorporated herein for all purposes by this reference.

BACKGROUND OF THE INVENTION

1. Field of the Invention

The present disclosure relates to a communication system, and more particularly, to an apparatus and method for performing beam design and beam selection in a communication system supporting satellite communication.

2. Description of the Related Art

Mobile communication systems are gradually evolving with each generation. Following the successful commercialization of the LTE (long term evolution) system, standardization and commercialization of the 5G (5-th generation) system are in progress, and discussions on the 6G (6-th generation) system are also actively taking place. Low earth orbit (LEO) satellite networks have shorter delay time than high earth orbit satellites and thus are suitable for 5G NR (New Radio) and next-generation communication systems.

SUMMARY OF THE INVENTION

An object of the present disclosure is to provide an apparatus and method for selecting a beam in a communication system supporting satellite communication.

An object of the present disclosure is to provide an apparatus and method for selecting a serving beam from among beams provided by a satellite in a communication system supporting satellite communication.

An object of the present disclosure is to provide an apparatus and method for selecting a beam in consideration of an effective coverage size in a communication system supporting satellite communication.

An object of the present disclosure is to provide an apparatus and method for determining an effective coverage size of a beam in a communication system supporting satellite communication.

An object of the present disclosure is to provide an apparatus and method for obtaining information necessary to determine an effective coverage size of a beam in a communication system supporting satellite communication.

According to an embodiment of the present disclosure, a method of performing beam selection of a user equipment (UE) in a communication system supporting satellite communication may include receiving first information about an elevation angle for supporting the satellite communication and second information about a beam center, determining coverage of a beam based on the first information and the second information, determining a distance between the UE and the beam center based on the second information, and selecting a serving beam for the UE based on the coverage of the beam and the distance.

According to an embodiment of the present disclosure, the first information and the second information may be received through system information, and the system information further may include at least one of a carrier frequency for supporting satellite communication for the UE, a subcarrier spacing, a minimum elevation angle, a maximum elevation angle, preamble information, an altitude of the satellite or a location of the beam center.

According to an embodiment of the present disclosure, the second information may include information about a center location of a beam transmitted by the satellite, the first information may have a different value depending on movement of the satellite, and the serving beam may be determined in consideration of the coverage of the beam having a different size depending on the elevation angle.

According to an embodiment of the present disclosure, each of the carrier frequency and the subcarrier spacing may vary depending on a frequency range (FR) set in the UE, the subcarrier spacing supported in FR1 may be 15, 30 or 60 kHz, the subcarrier spacing supported in FR2 may be 60 kHz or 120 kHz, and the serving beam may be determined in consideration of the coverage of the beam having a different size depending on a frequency band set in the UE.

According to an embodiment of the present disclosure, the coverage of the beam may vary depending on a subcarrier spacing set for the UE, a frequency band, an elevation angle depending on movement of the satellite, the coverage of the beam may change to ½ as the subcarrier spacing increases from N to 2N, the coverage of the beam may change to ⅓ as the frequency band increases from M to 2M, and the serving beam may be selected in consideration of an elevation angle depending on movement of the satellite.

According to an embodiment of the present disclosure, the coverage of the beam may be determined based on change characteristics of a residual Doppler value remaining after compensation based on the beam center, depending on a distance from the beam center.

According to an embodiment of the present disclosure, the determining the size of the coverage of the beam may include determining a maximum residual Doppler value based on an orbit or altitude of the satellite and a carrier frequency of a signal transmitted through the beam and determining a size of the coverage based on the maximum residual Doppler value and the subcarrier spacing of the signal.

According to an embodiment of the present disclosure, the method may further include checking a parameter indicating the subcarrier spacing included in a master information block (MIB) transmitted from the satellite and checking the subcarrier spacing based on the parameter.

According to an embodiment of the present disclosure, the checking the subcarrier spacing may include interpreting the parameter based on a frequency range (FR) to which a frequency at which a parameter indicating the subcarrier spacing is received belongs.

According to an embodiment of the present disclosure, the method may further include checking a parameter indicating the carrier frequency included in system information related to the satellite.

According to an embodiment of the present disclosure, the method may further include estimating the location of the beam center or a distance between the UE and the beam center based on information obtained through system information.

According to an embodiment of the present disclosure, the method may further include checking information about the location of the beam center included in a system information block including auxiliary information for NTN access.

According to an embodiment of the present disclosure, the selecting the serving beam may include selecting a beam carrying the first information and the second information as the serving beam, based on the distance being equal to or less than a size of the coverage.

According to an embodiment of the present disclosure, the determining the coverage of the beam may include determining a first beam size considering differential delay based on a first information set obtained based on system information, determining a second beam size considering Doppler shift based on a second information set obtained based on the system information, and determining a size of a coverage of a beam used in the satellite based on the smaller of the first beam size and the second beam size.

According to an embodiment of the present disclosure, the first information set may include at least one of a minimum elevation angle, preamble information, a subcarrier spacing or an altitude of the satellite, and the second information set may include at least one of a carrier frequency of a signal transmitted through the beam, the subcarrier spacing, a maximum elevation angle or the altitude of the satellite.

According to an embodiment of the present disclosure, the differential delay may be limited based on at least one of a maximum random access distance or a maximum timing advance distance.

According to an embodiment of the present disclosure, the first beam size may be determined based on a maximum random access distance calculated using random access preamble information.

According to an embodiment of the present disclosure, the first information set may include a minimum elevation angle, and the minimum elevation angle may include a predefined value.

According to an embodiment of the present disclosure, the second information set may include a maximum elevation angle, and the maximum elevation angle may include auxiliary information for NTN access.

According to an embodiment of the present disclosure, a user equipment (UE) in a wireless communication system may include a transceiver and at least one processor connected to the transceiver. The at least one processor may receive first information about an elevation angle for supporting satellite communication and second information about a beam center, determine coverage of a beam based on the first information and the second information, determine a distance between the UE and the beam center based on the second information, and select a serving beam for the UE based on the coverage of the beam and the distance.

BRIEF DESCRIPTION OF THE DRAWINGS

The above and other objects, features and other advantages of the present invention will be more clearly understood from the following detailed description taken in conjunction with the accompanying drawings, in which.

4

Figure 3:
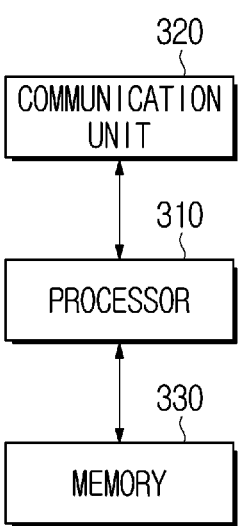
Figure 4A:
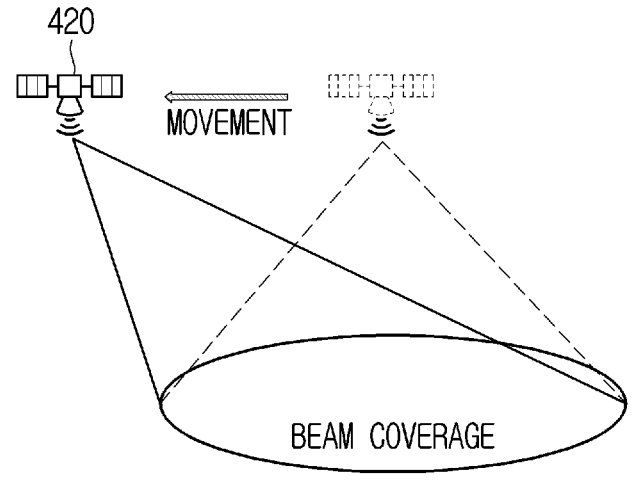
Figure 4B:
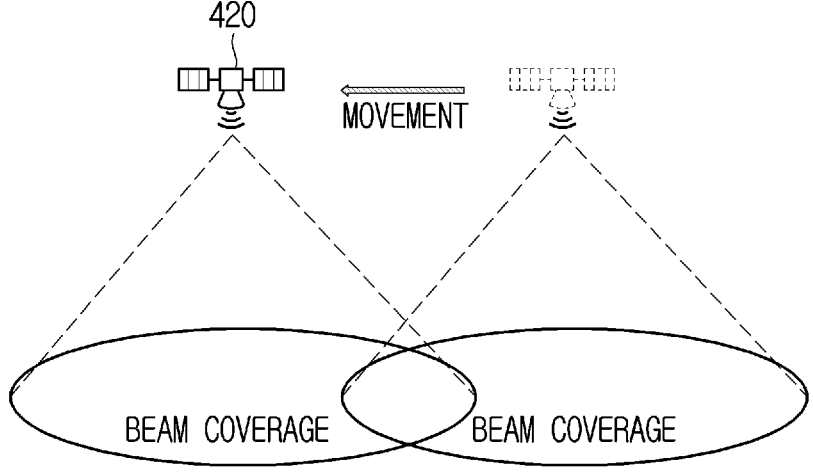
Figure 5:
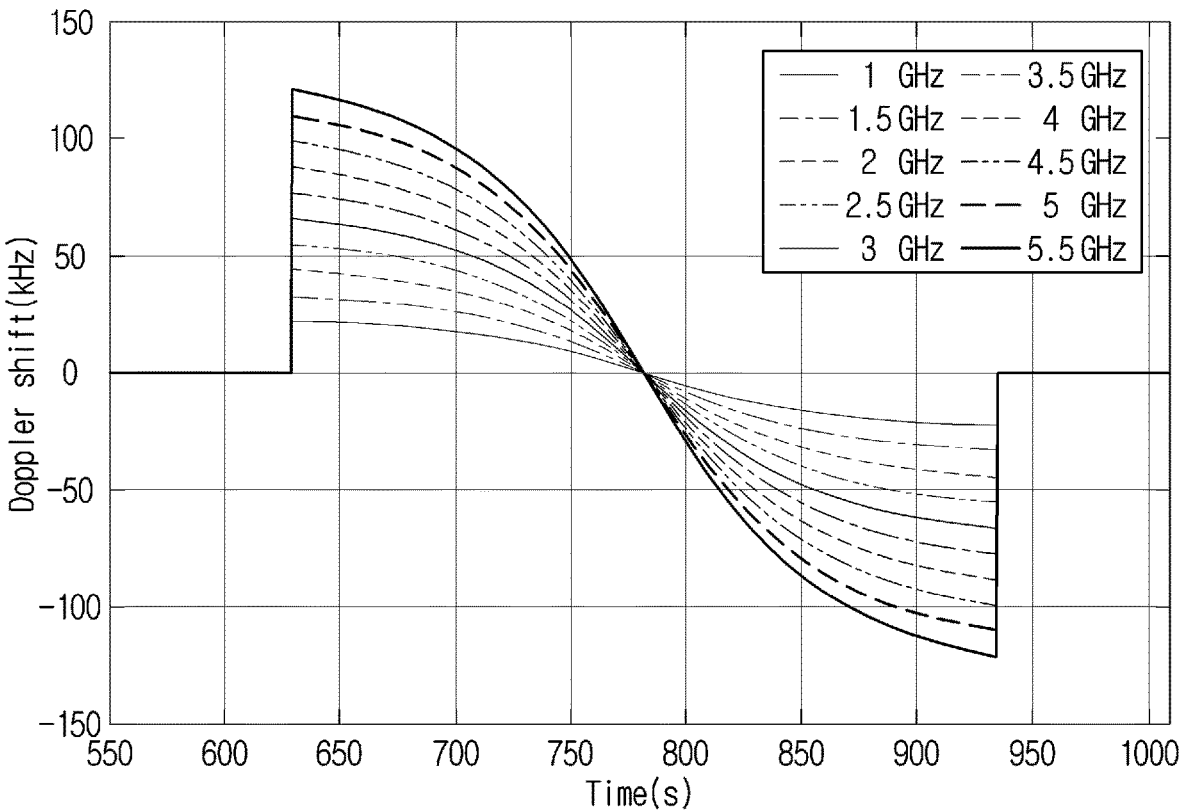
Figure 6:
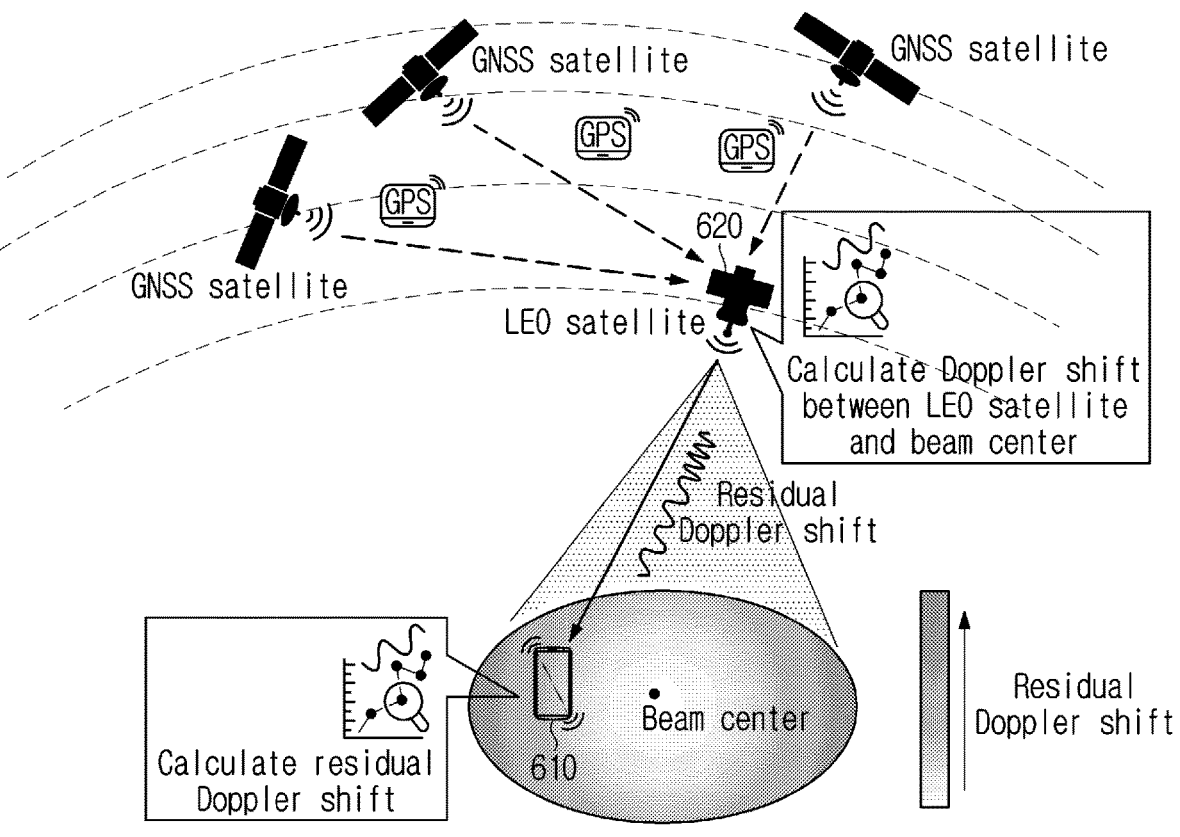
Figure 8:
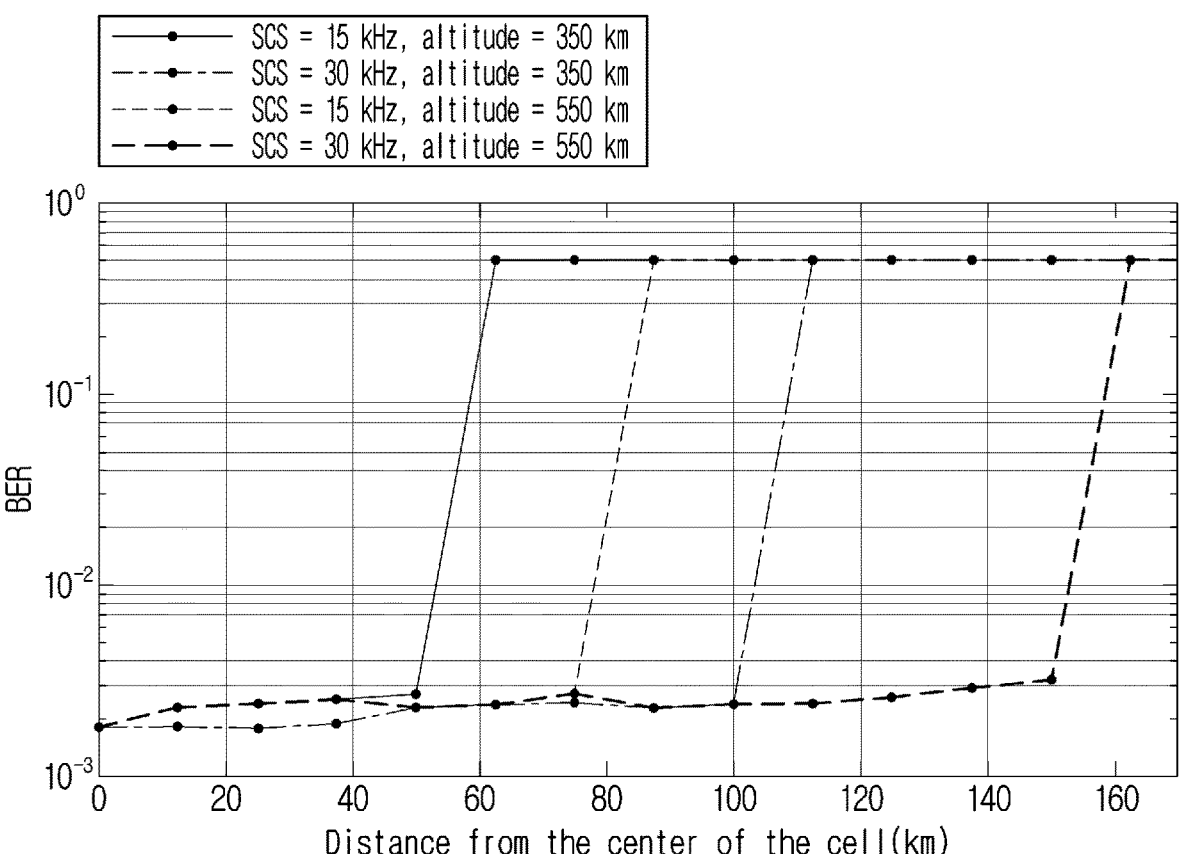
Figure 9:
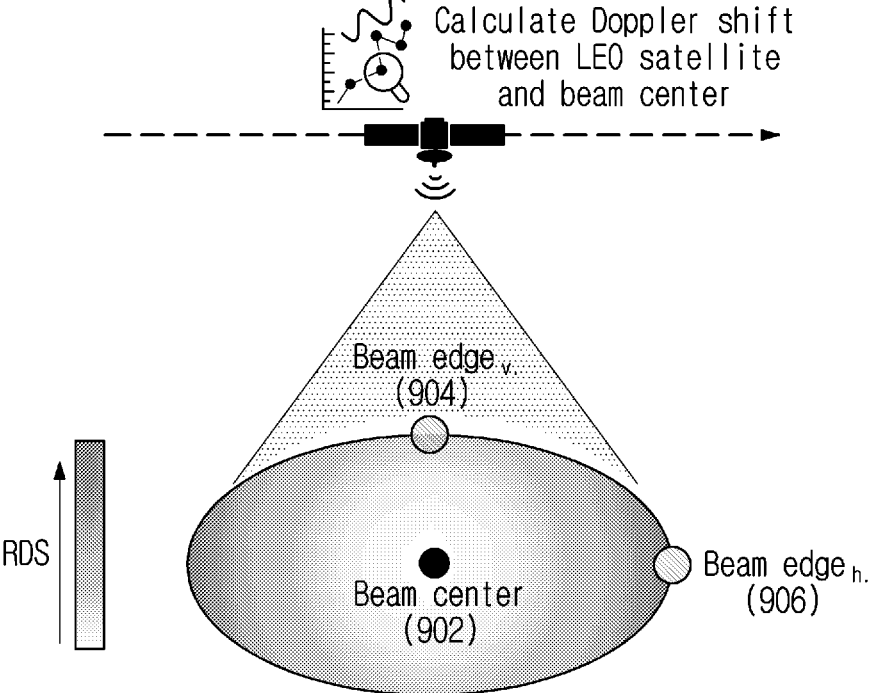
Figure 10:
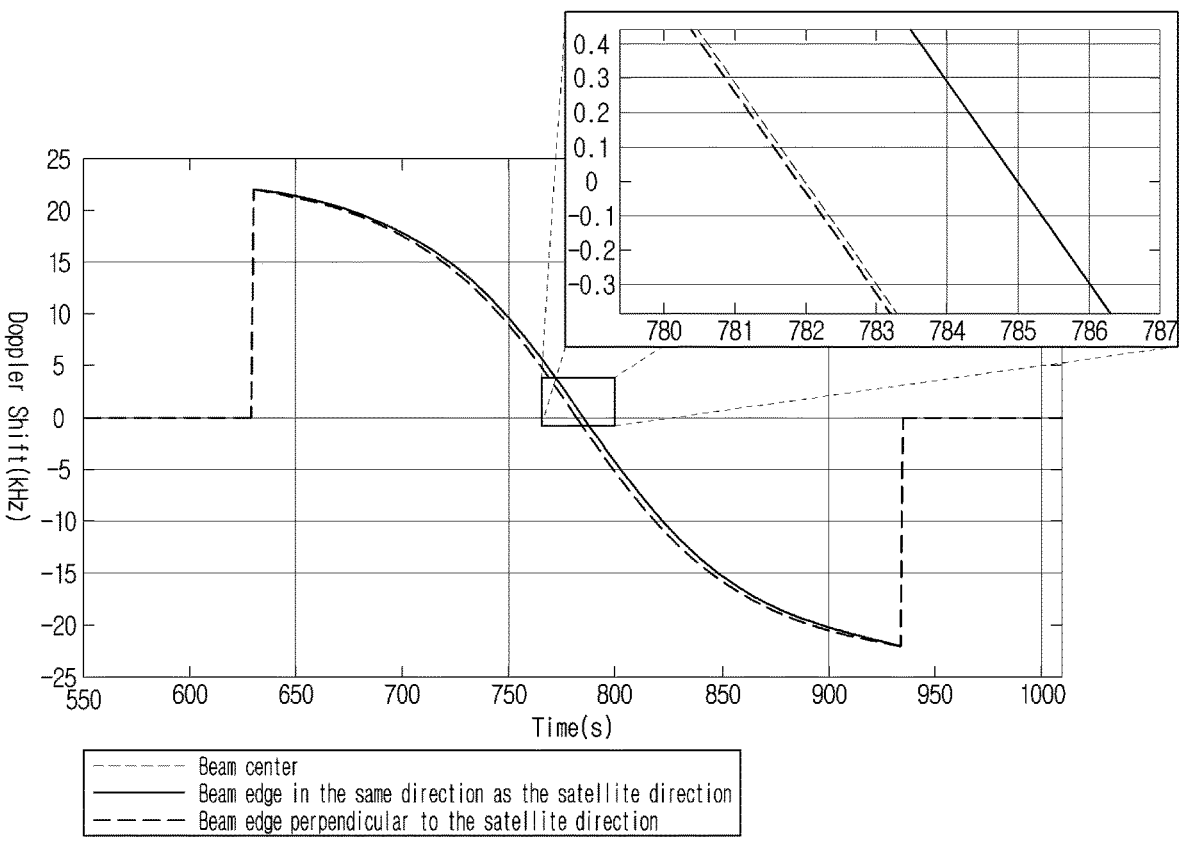
Figure 11:
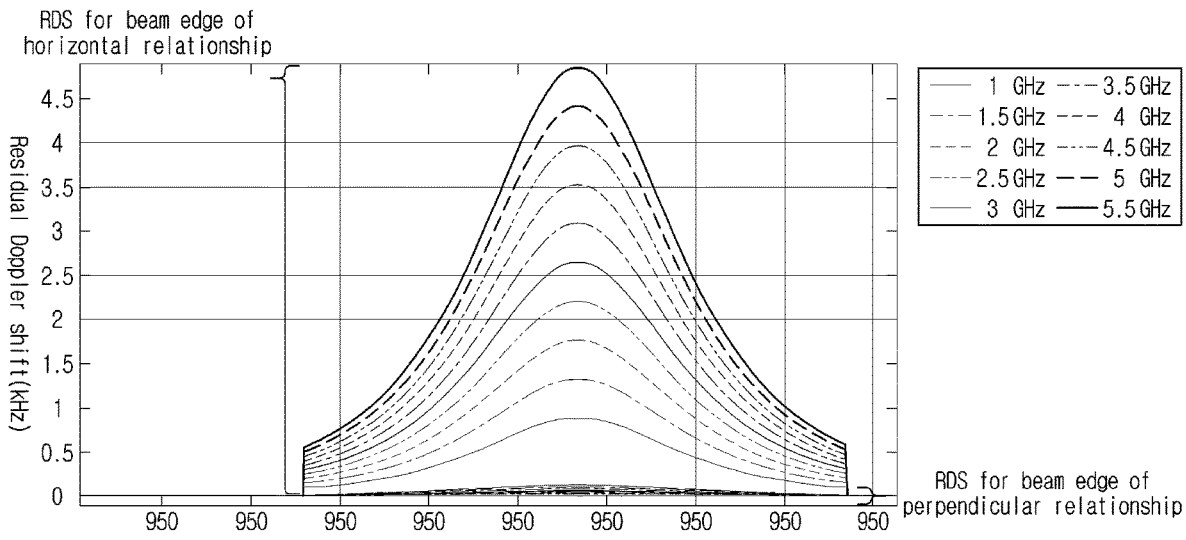
Figure 12:
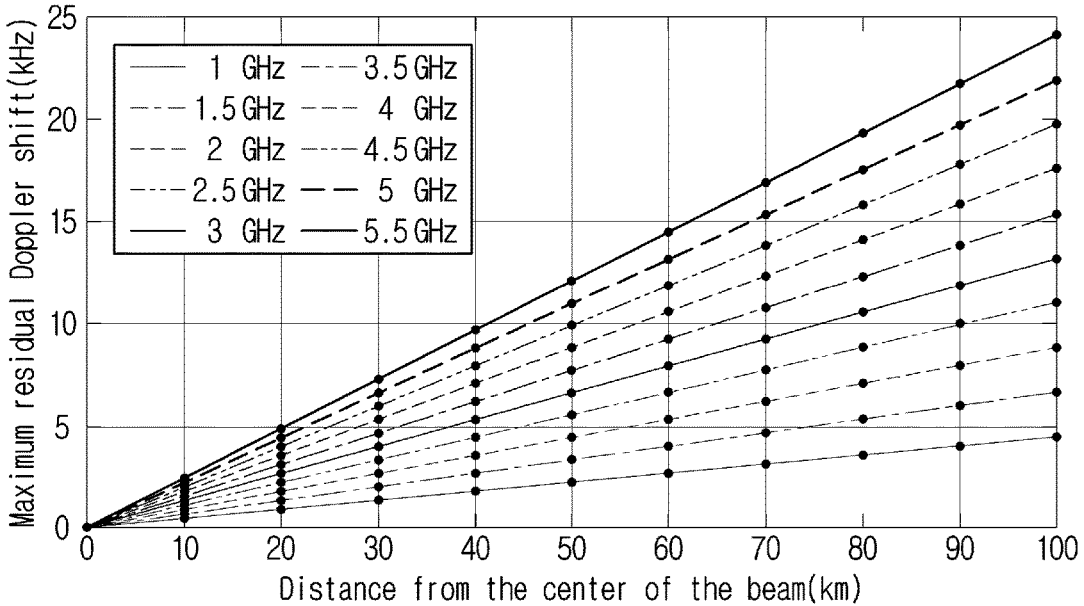
Figure 13:
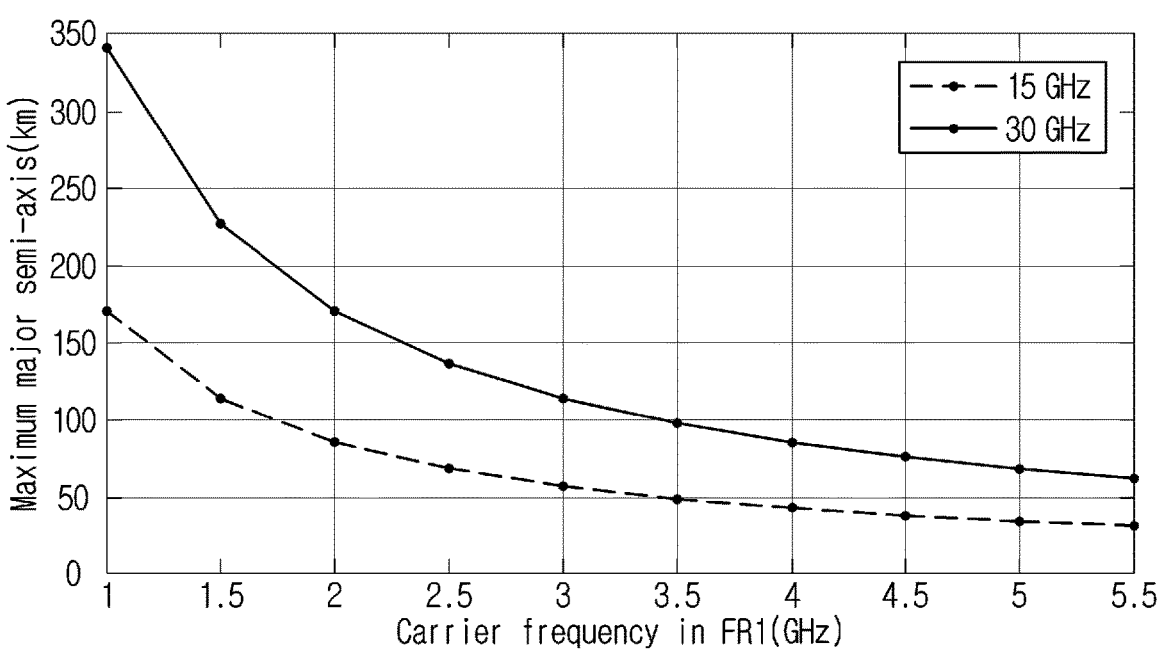
Figure 14:
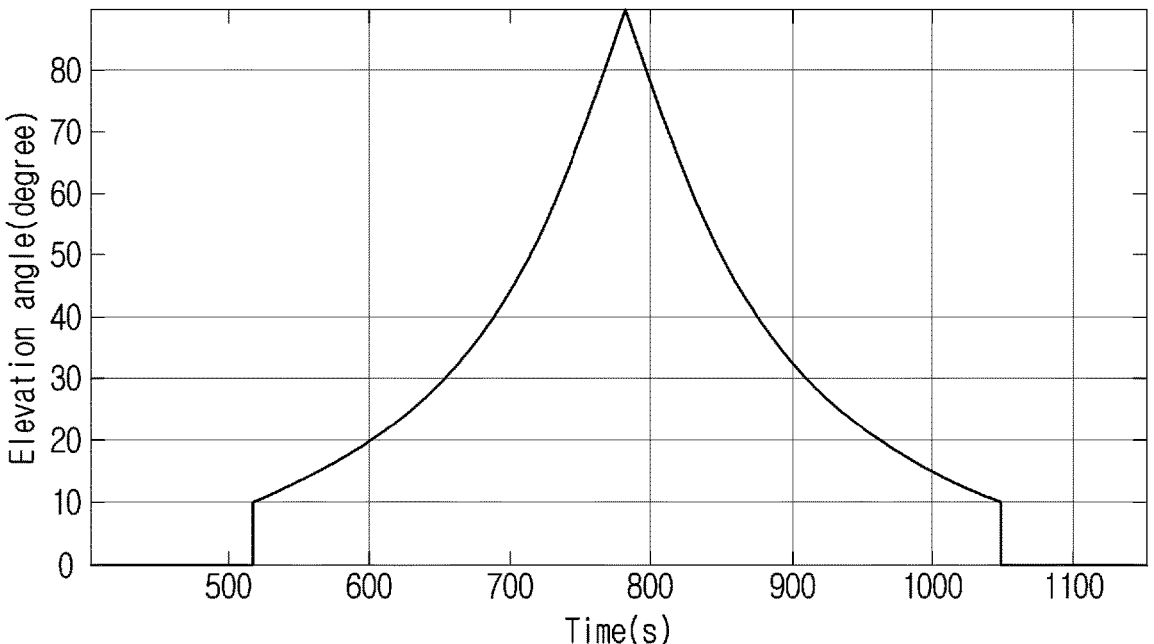
Figure 15:
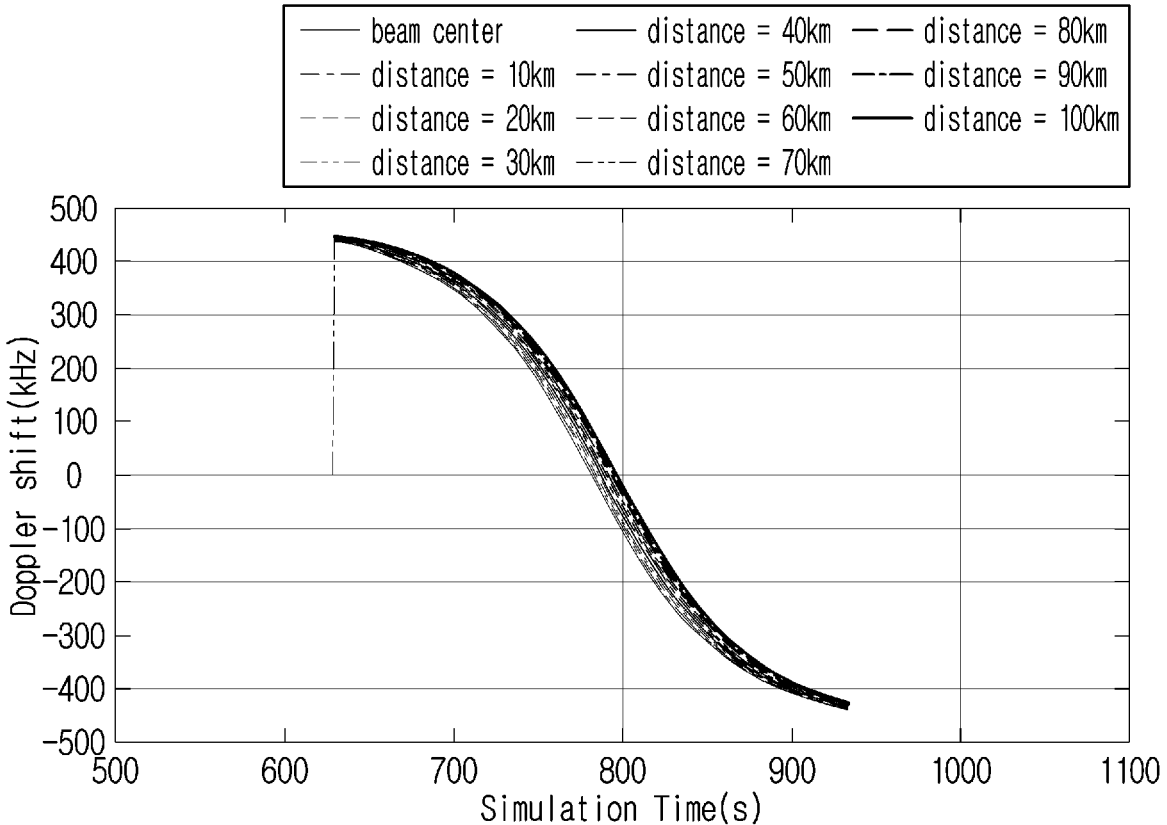
Figure 16:
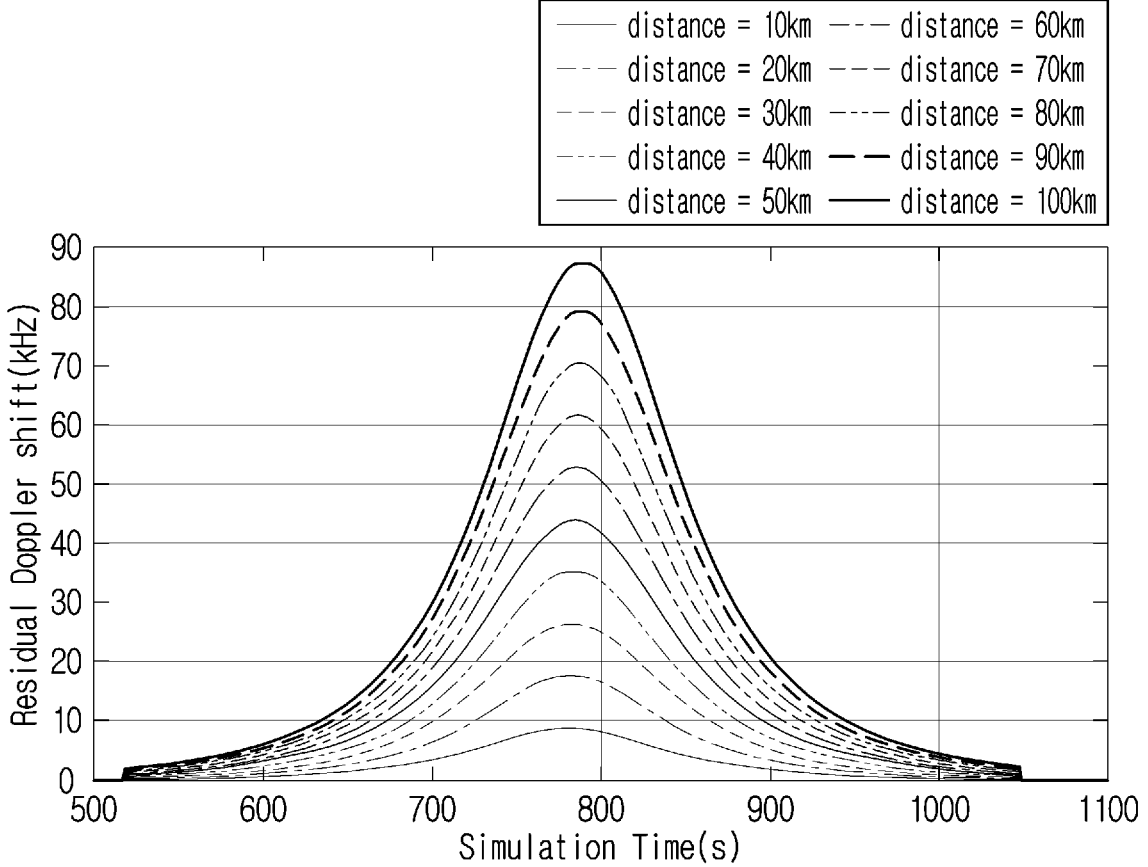
Figure 17:
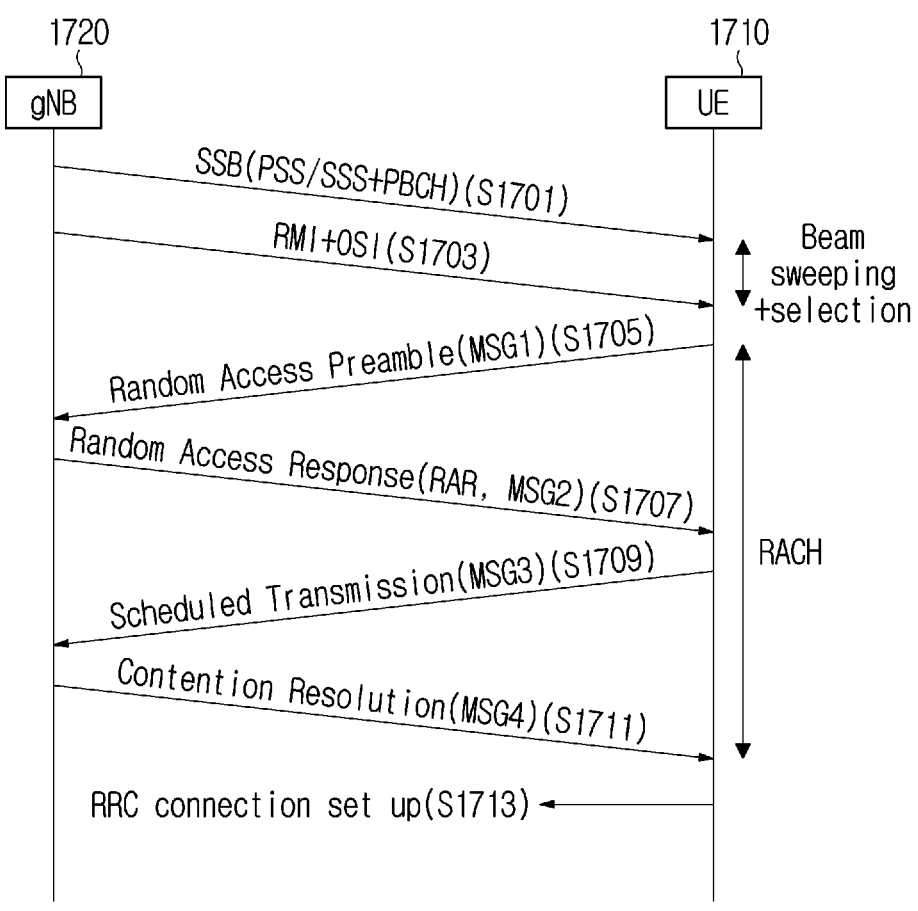
Figure 18:
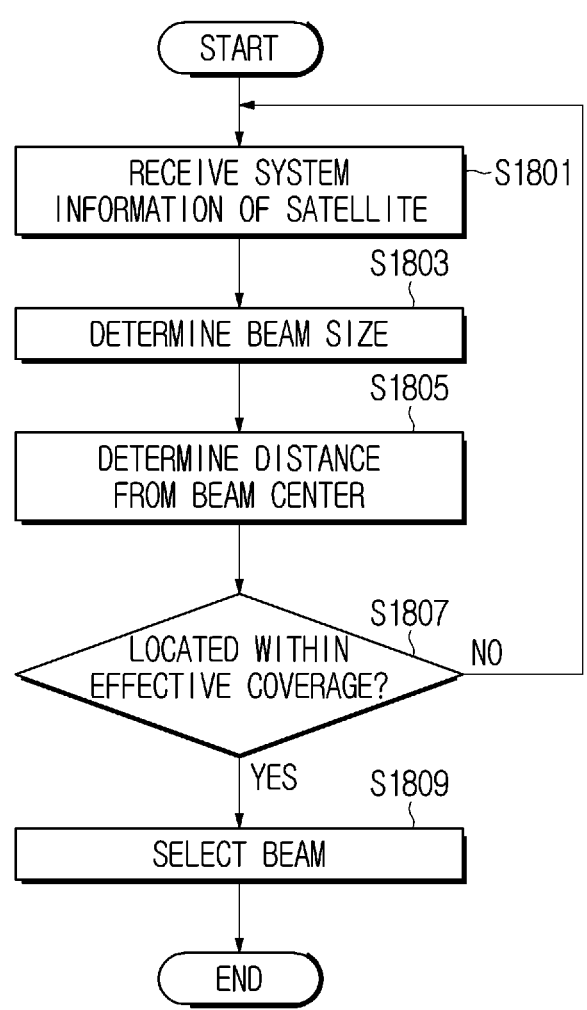
Figure 19:
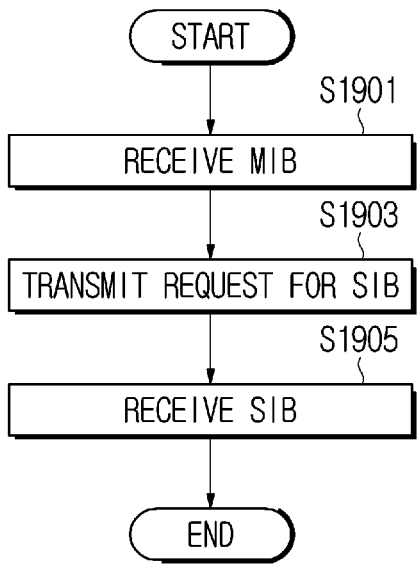
Figure 20:
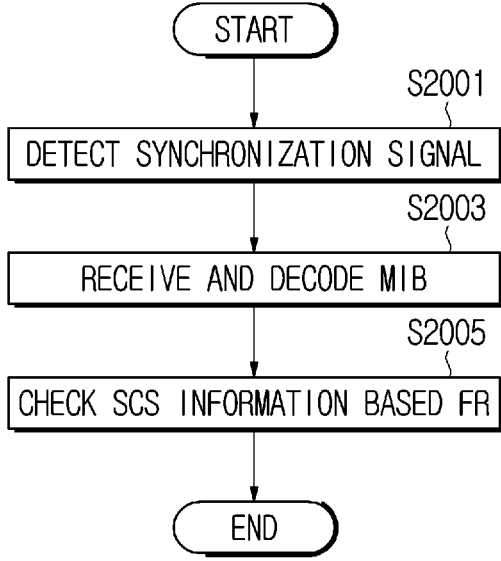
Figure 21:
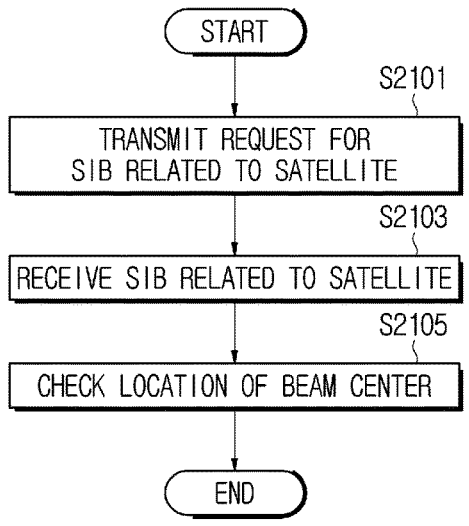
Figure 22A:
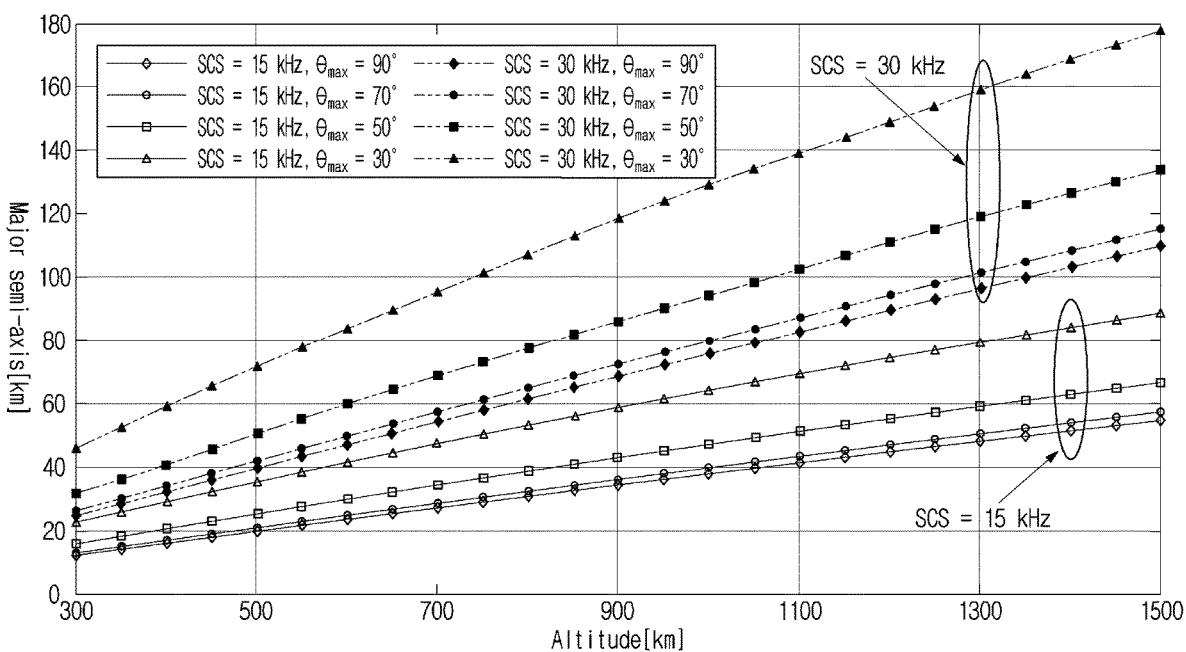
Figure 22B:
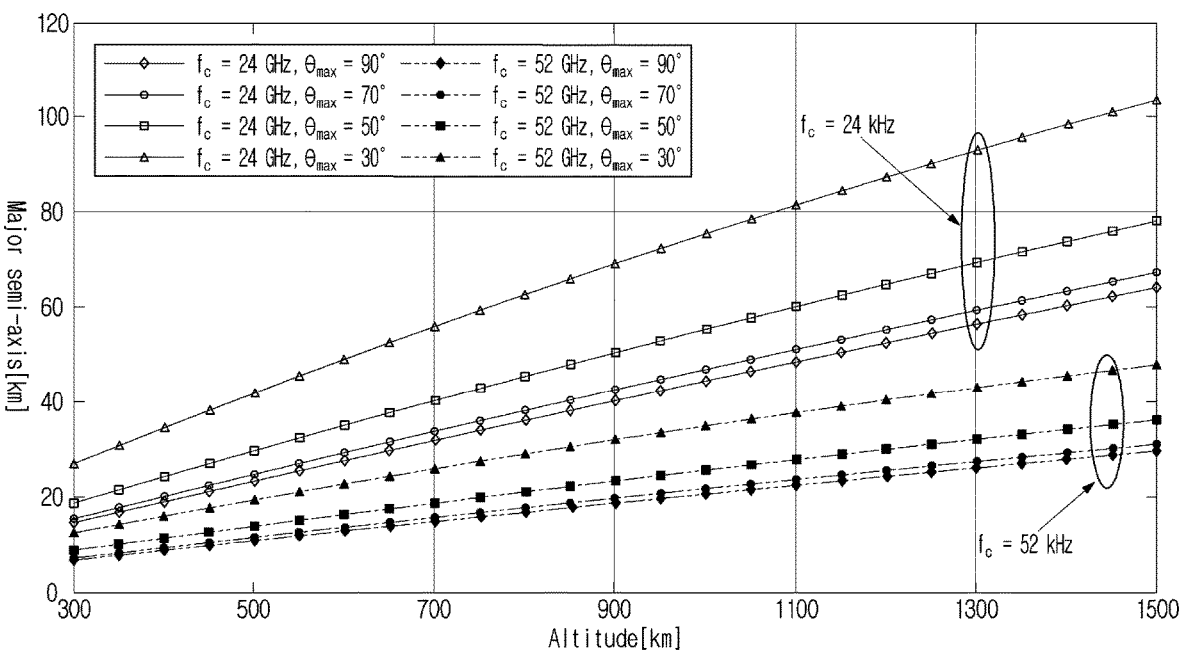
Figure 22C:
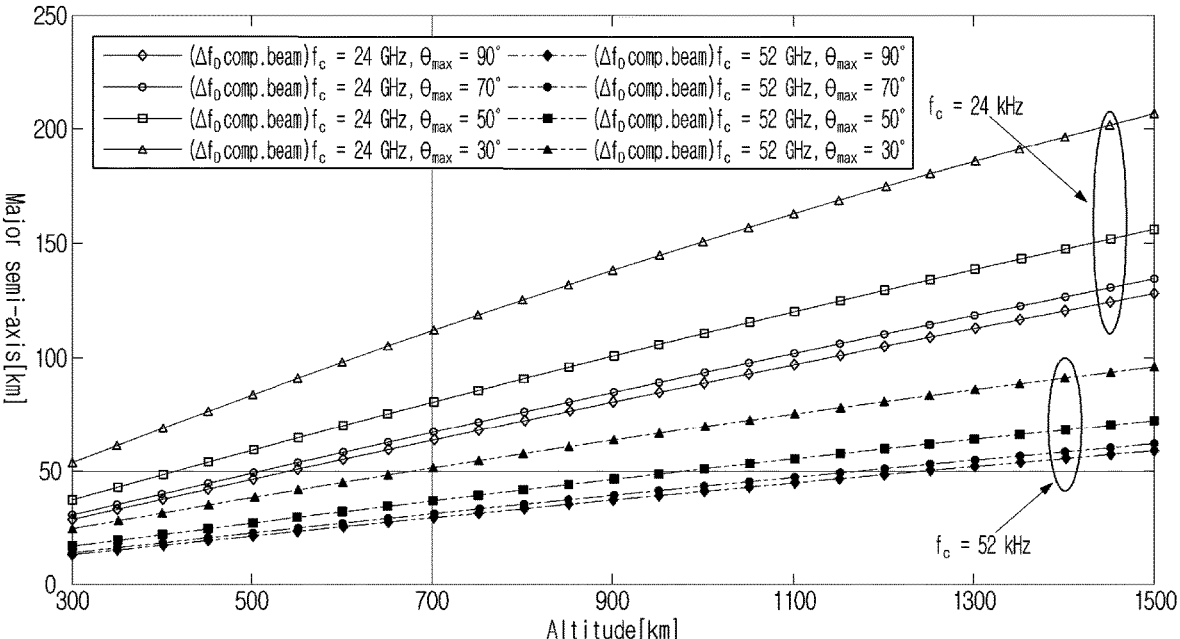
Figure 23A:
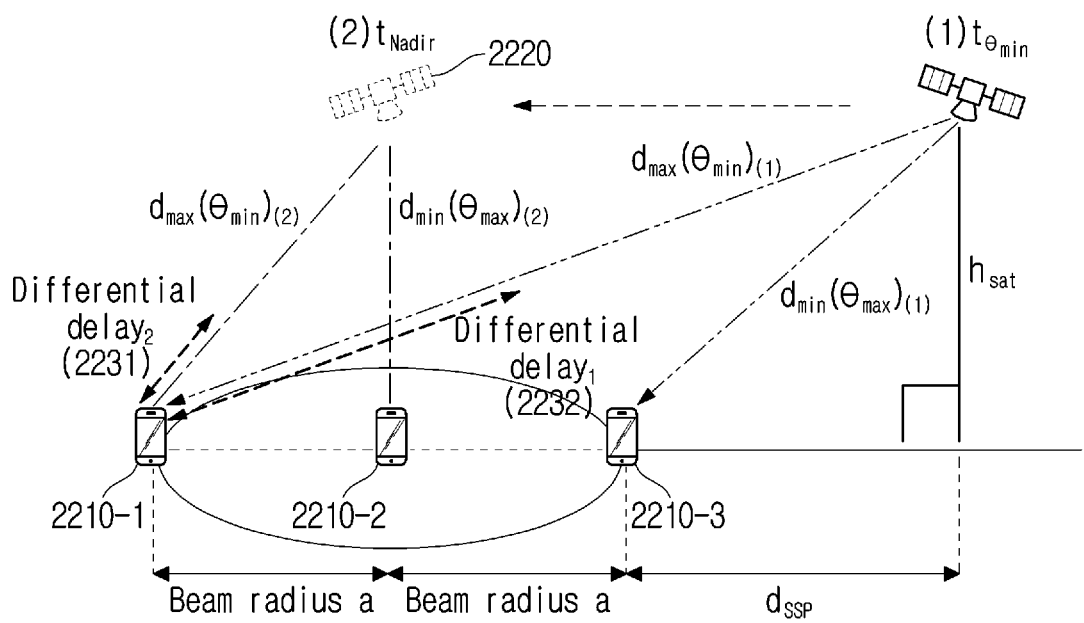
Figure 23B:
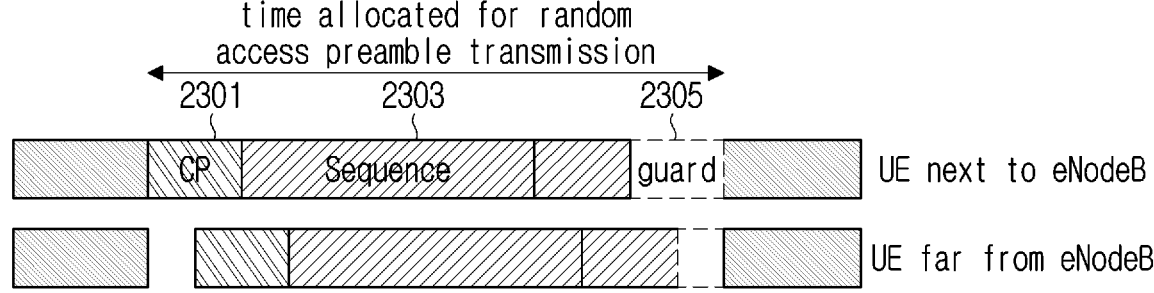
Figure 24A:
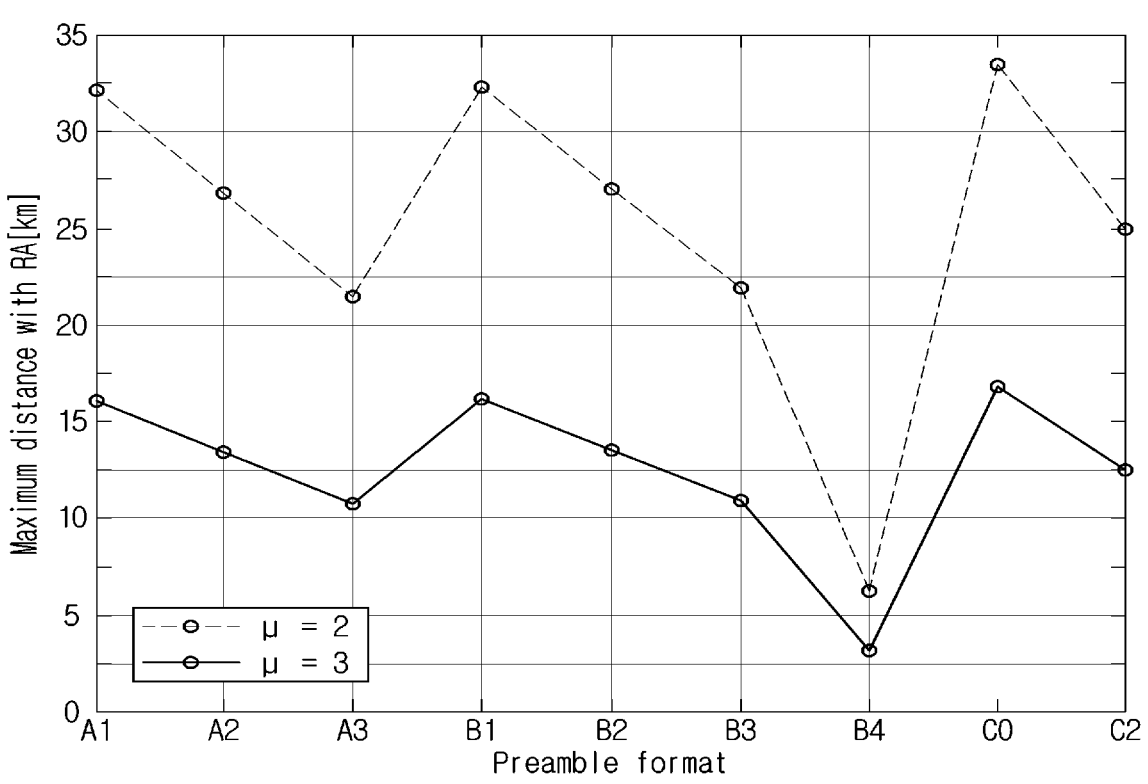
Figure 24B:
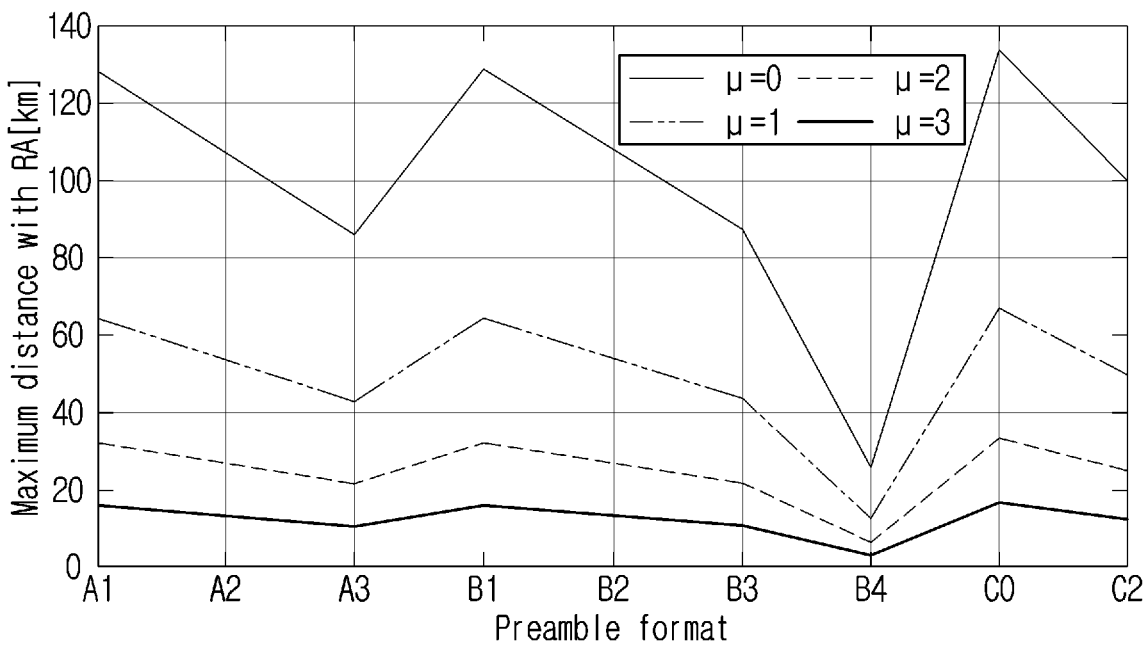
Figure 25:
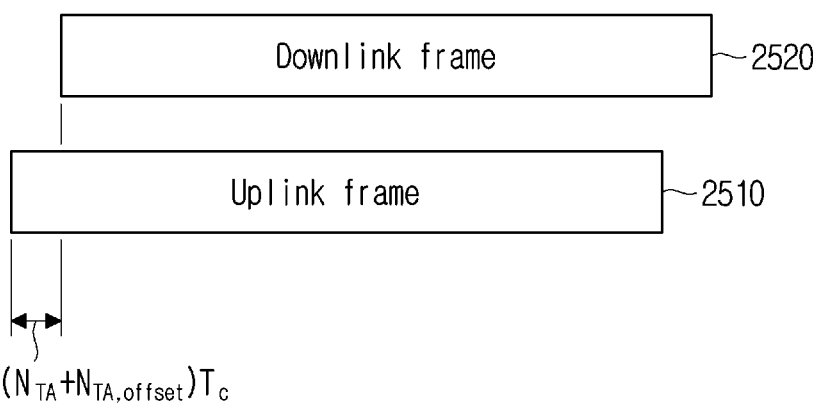
Figure 26:
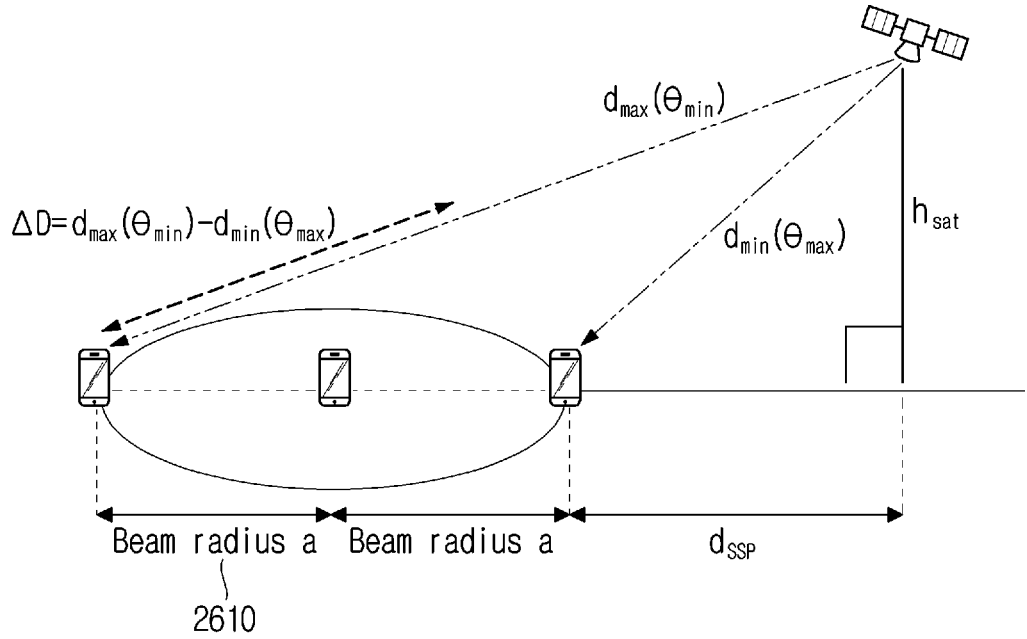
Figure 27A:
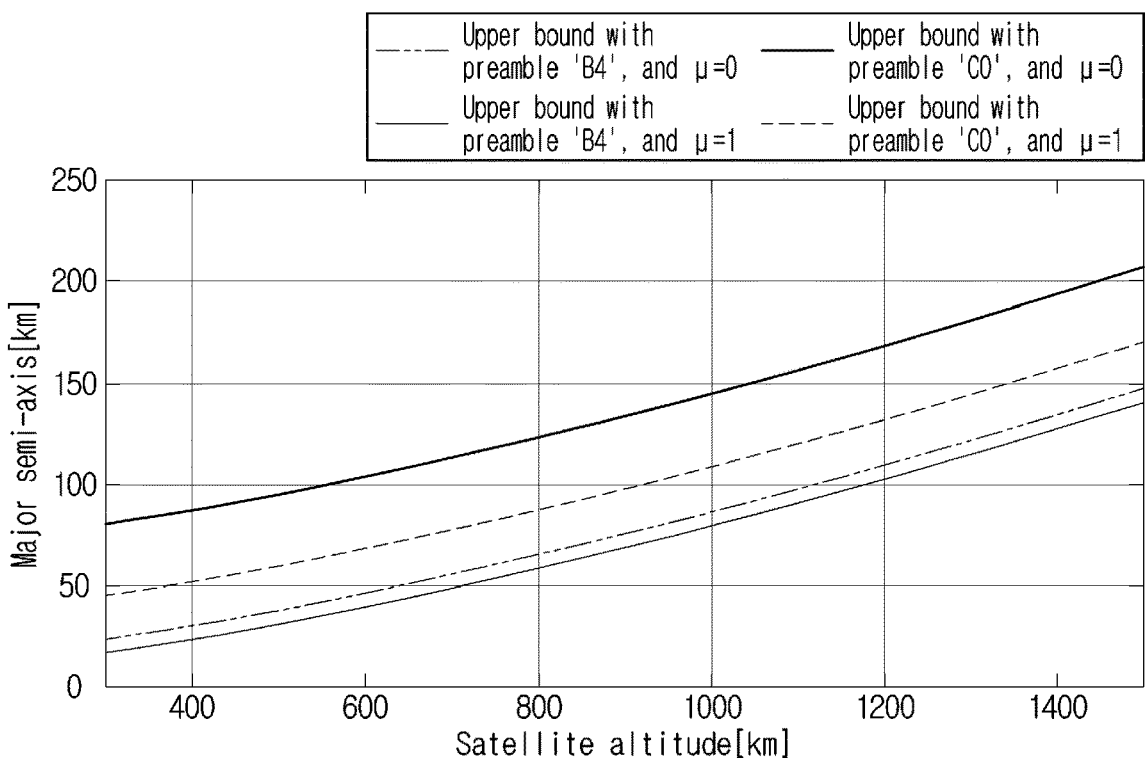
Figure 27B:
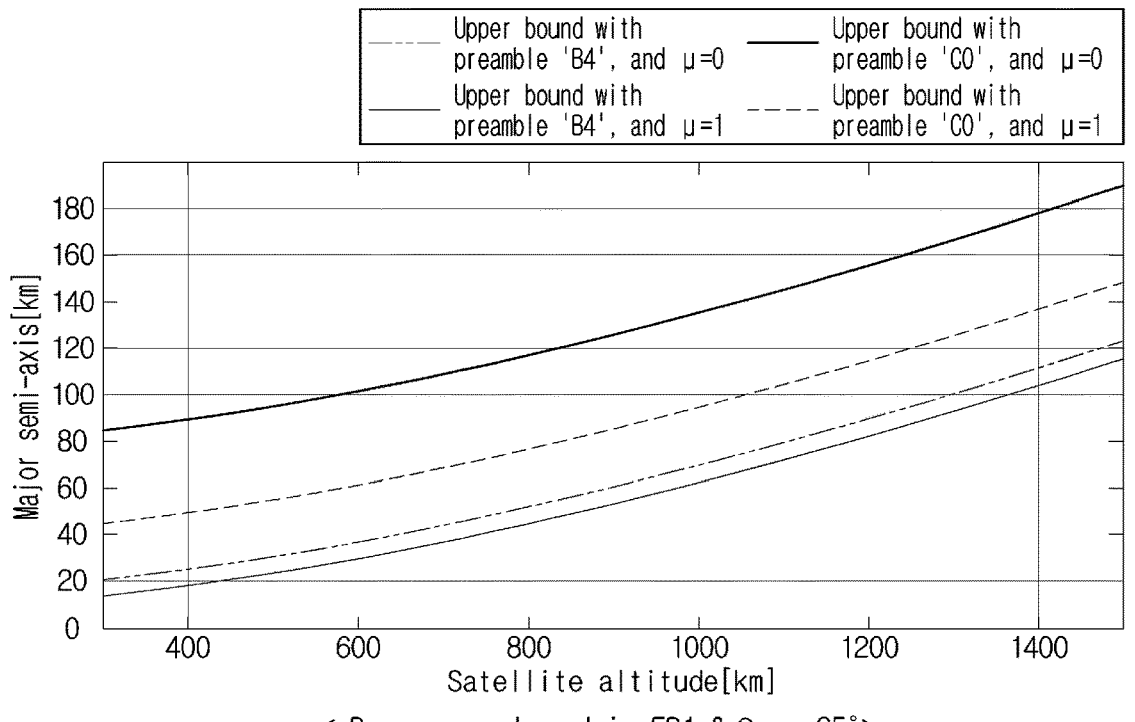
Figure 28A:
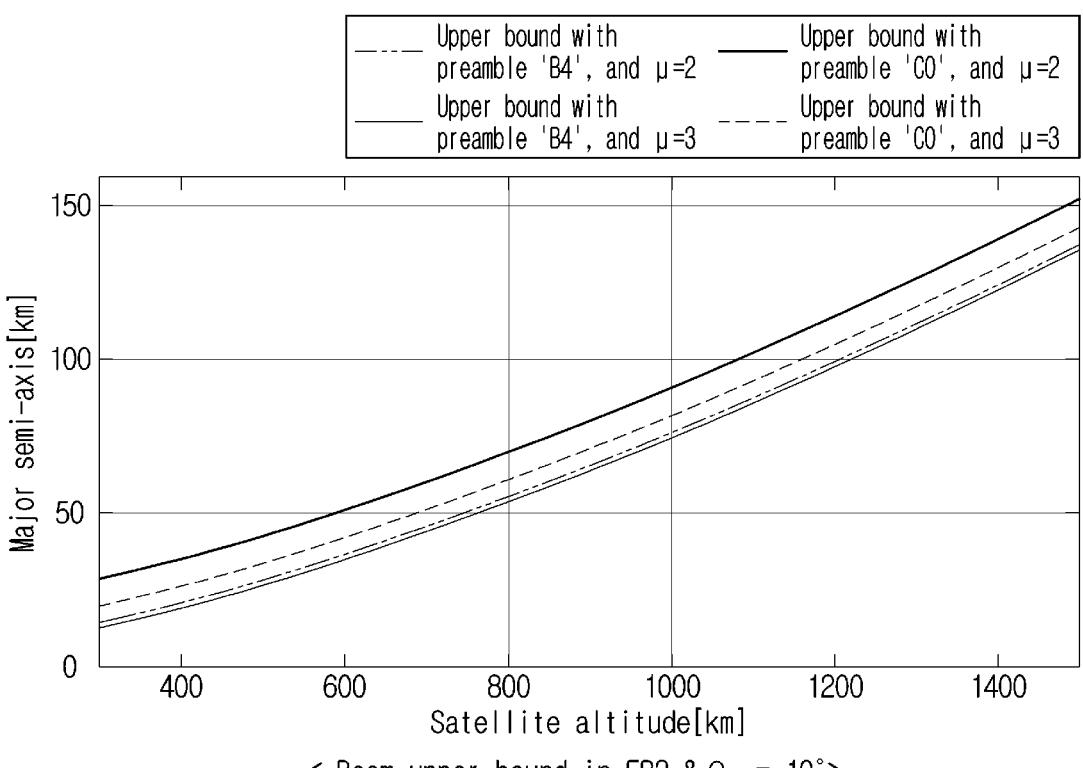
Figure 28B:
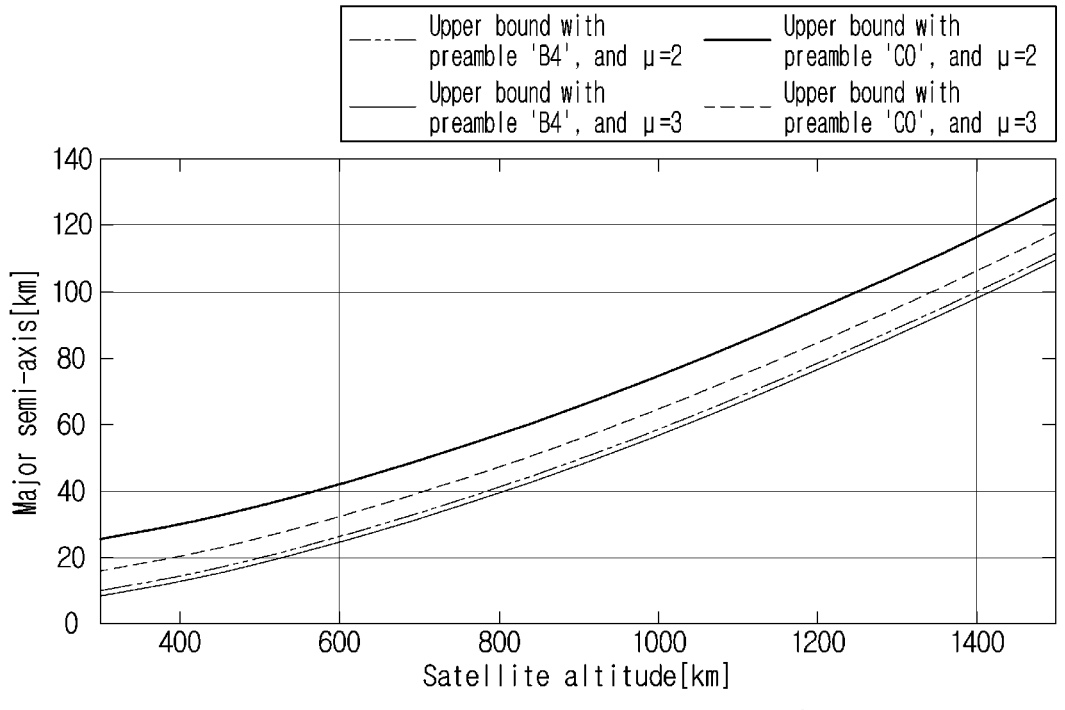
Figure 29:
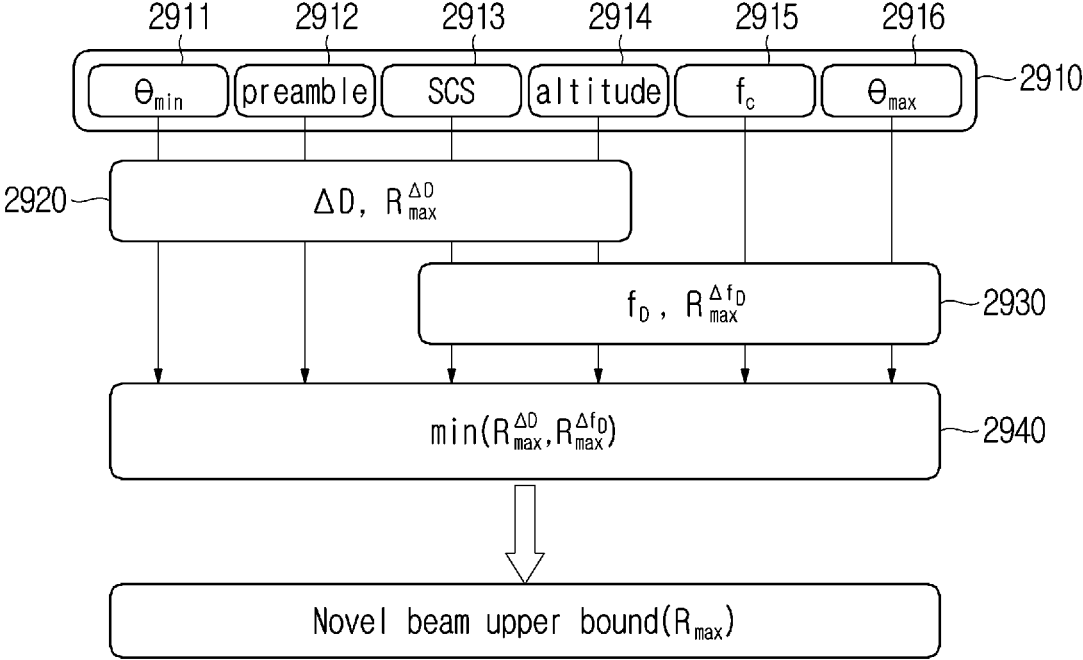
Figure 31:
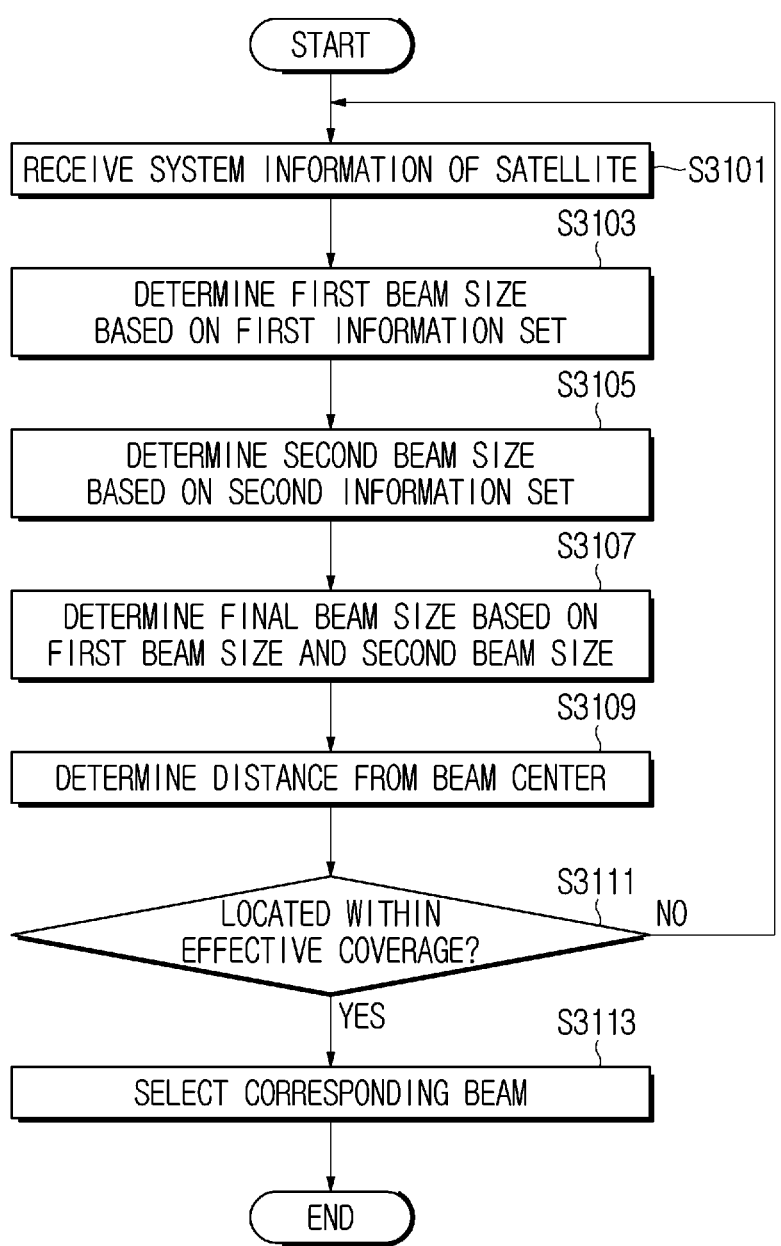
Figure 32:
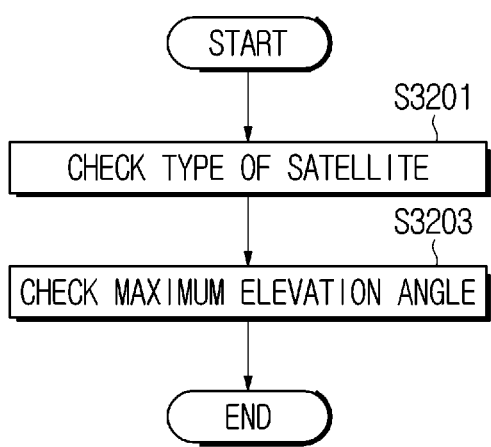
Figure 33:
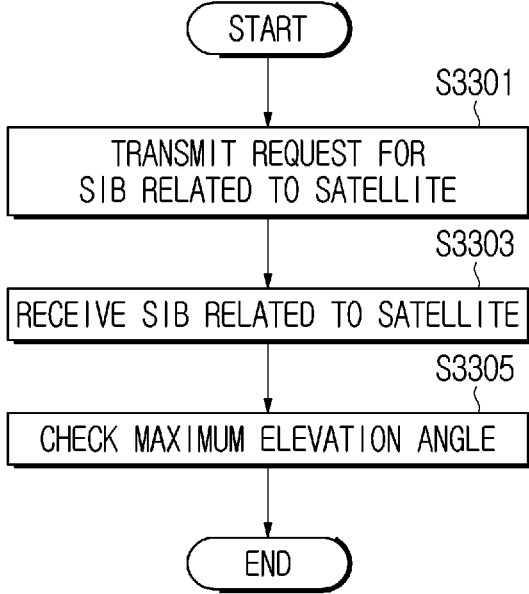

FIG. 3 illustrates a configuration of an apparatus in a system supporting satellite communication according to an embodiment of the present disclosure;

FIGS. 4A and 4B are diagrams illustrating a fixed beam cell and a moving beam cell provided by a satellite in system supporting satellite communication according to an embodiment of the present disclosure;

FIG. 5 illustrates the results of a simulation experiment on Doppler shift that may occur for each carrier frequency in a communication system supporting satellite communication according to an embodiment of the present disclosure;

FIG. 6 illustrates the concept of pre-compensation for Doppler shift in a communication system supporting satellite communication according to an embodiment of the present disclosure;

FIGS. 7A to 7D illustrate changes in residual Doppler shift depending on a distance from a beam center in a communication system supporting satellite communication according to an embodiment of the present disclosure;

FIG. 8 illustrates a change in bit error rate (BER) according to a distance from a beam center in a communication system supporting satellite communication according to an embodiment of the present disclosure;

FIG. 9 illustrates a difference in residual Doppler shift according to a location within coverage in a communication system supporting satellite communication according to an embodiment of the present disclosure;

FIG. 10 illustrates a comparison of patterns of Doppler shift at a beam center and a beam edge in a communication system supporting satellite communication according to an embodiment of the present disclosure;

FIG. 11 illustrates a residual Doppler shift for each carrier frequency of a satellite occurring at a beam edge located in a direction perpendicular to a moving direction of a satellite in a communication system supporting satellite communication according to an embodiment of the present disclosure;

FIG. 12 illustrates a maximum residual Doppler shift depending on a distance from a beam center in a communication system supporting satellite communication according to an embodiment of the present disclosure;

FIG. 13 illustrates a semi-major axis of effective beam coverage according to carrier frequency and SCS in a communication system supporting satellite communication according to an embodiment of the present disclosure;

FIG. 14 illustrates a change in elevation angle according to movement of a satellite in a communication system supporting satellite communication according to an embodiment of the present disclosure;

FIG. 15 illustrates a change in Doppler shift for each distance from a beam center to a beam edge according to movement of a satellite in a communication system supporting satellite communication according to an embodiment of the present disclosure;

FIG. 16 illustrates a change in residual Doppler shift according to a distance from a beam center to a beam edge as the satellite moves in a communication system supporting satellite communication according to an embodiment of the present disclosure;

FIG. 17 illustrates an initial access procedure in a communication system supporting satellite communication according to an embodiment of the present disclosure;

FIG. 18 illustrates an example of a beam selection procedure according to an embodiment of the present disclosure;

FIG. 19 shows an example of a procedure for obtaining information for beam selection according to an embodiment of the present disclosure;

FIG. 20 illustrates an example of a procedure for obtaining subcarrier spacing information according to an embodiment of the present disclosure;

FIG. 21 illustrates an example of a procedure for obtaining beam center location information according to an embodiment of the present disclosure;

FIGS. 22A to 22C illustrate simulation results for the semi-major axis of beam coverage according to satellite altitude in a communication system supporting satellite communication according to an embodiment of the present disclosure;

FIG. 23A illustrates the concept of differential delay in a communication system supporting satellite communication according to an embodiment of the present disclosure;

FIG. 23B illustrates the format of a random access preamble in a communication system supporting satellite communication according to an embodiment of the present disclosure;

FIGS. 24A and 24B illustrate a maximum random access distance for each preamble format in a communication system supporting satellite communication according to an embodiment of the present disclosure;

FIG. 25 illustrates an uplink and downlink timing relationship in a communication system supporting satellite communication according to an embodiment of the present disclosure;

FIG. 26 illustrates a beam radius of a satellite in a communication system supporting satellite communication according to an embodiment of the present disclosure;

FIGS. 27A and 27B illustrate simulation results for beam size according to satellite altitude in a communication system supporting satellite communication according to an embodiment of the present disclosure;

FIGS. 28A and 28B illustrate simulation results for beam size according to satellite altitude in a communication system supporting satellite communication according to an embodiment of the present disclosure;

FIG. 29 illustrates the concept of determining a final beam size upper bound in a communication system supporting satellite communication according to an embodiment of the present disclosure;

FIGS. 30A to 30D illustrate simulation results for the semi-major axis of beam coverage according to satellite altitude in a communication system supporting satellite communication according to an embodiment of the present disclosure;

FIG. 31 illustrates an example of a beam selection procedure according to an embodiment of the present disclosure;

FIG. 32 illustrates an example of a procedure for obtaining a minimum elevation angle according to an embodiment of the present disclosure; and FIG. 33 illustrates an example of a procedure for obtaining a maximum elevation angle according to an embodiment of the present disclosure.

DESCRIPTION OF THE PREFERRED EMBODIMENTS

The terms used in the present embodiments were selected from widely used general terms as possible while considering the functions in the present embodiments, but this may vary depending on the intention or precedent of a technician working in the field, the emergence of new technology, etc. In addition, in certain cases, there are terms arbitrarily selected by the applicant, and in this case, the meaning will be described in detail in the relevant section. Therefore, the terms used in the present embodiments should be defined based on the meaning of the term and the overall content of the present embodiments, rather than simply the name of the term.

Since these embodiments may be variously modified and have various forms, some embodiments will be illustrated in the drawings and described in detail. However, this is not intended to limit the present embodiments to a specific disclosure form, and should be understood to include all changes, equivalents, and substitutes included in the spirit and technical scope of the present embodiments. The terms used in this specification are merely used to describe the embodiments and are not intended to limit the embodiments.

Unless otherwise defined, the terms used in the present embodiments have the same meaning as generally understood by those skilled in the art to which the present embodiments belong. Terms defined in commonly used dictionaries should be interpreted as having meanings consistent with the meanings they have in the context of the related technology, and unless clearly defined in the present embodiments, they should not be interpreted in an ideal or excessively formal sense.

One of the main problems in low earth orbit (LEO) satellite networks is high mobility of low earth orbit satellites. Doppler shift due to high mobility must be considered in low earth orbit satellite network design. Although several studies have been proposed to overcome Doppler shift in low Earth orbit satellite networks, research on NR-based Non-Terrestrial Network (NTN) is still insufficient. Accordingly, the present disclosure proposes cell management technology of a low earth orbit satellite network for analyzing the characteristics of the Doppler shift in a low earth orbit satellite network when applying a compensation scenario and overcoming the Doppler shift by considering the analyzed Doppler shift and NR characteristics. Specifically, the present disclosure describes various embodiments for determining and controlling the size of a beam for providing a cell of a low earth orbit satellite network and signaling related information.

Figure 1:
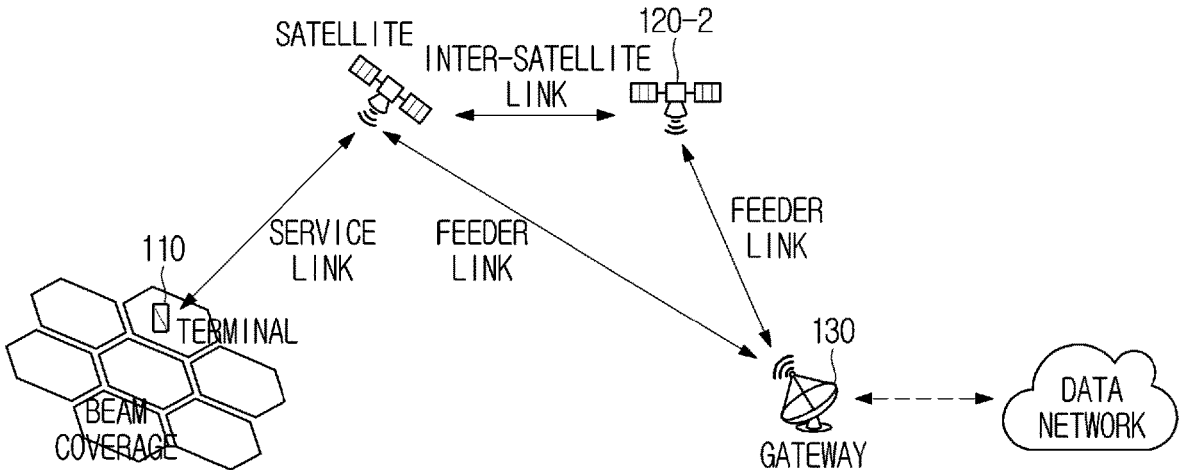
FIG. 1 illustrates an example of a system supporting satellite communication according to an embodiment of the present disclosure.

FIG. 1 illustrates an example of a system supporting satellite communication according to an embodiment of the present disclosure.

Referring to FIG. 1, the satellite network includes a terminal 110, satellites 120-1 and 120-2, and a gateway 130. The terminal 110 is a user device and may be mobile or a fixed device. The terminal 110 may support variable service bands and operation information depending on the capabilities of the terminal 110 and application operation. Additionally, the terminal 110 may be operated in a fixed form, a form specialized for mobility, or various forms depending on the characteristics of the terminal 110. The terminal 110 may be referred to as 'user equipment (UE).' The satellites 120-1 and 120-2 fly/operate in a given orbit and form a beam toward the ground to provide a cell with a certain size of coverage. The gateway 130 provides the satellites 120-1 and 120-2 with a link to access the network.

According to an example of the present disclosure, the link between the terminal 110 and the satellite 120-1 is called a service link, and a link between the satellites 120-1 and 120-2 and the gateway 130 is called a feeder link. Here, the link may be a link based on the NR standard. Alternatively, a link defined newly in an evolved next-generation wireless communication system may be adaptively applied, or a link based on various interfaces of a communication system introduced due to industrial needs rather than the NR standard may be applied. Additionally, an inter-satellite link (ISL) may be used primarily for regenerative satellites.

According to one example, for a transparent satellite based on NR-RAN architecture, the satellite radio interface of the feeder link and service link may be NR-Uu. In the case of transparent satellites, the satellite performs radio frequency filtering and frequency conversion and amplification functions. In the case of regenerative satellites, an on board function is built in the satellite. Therefore, the satellite may perform some or all of the base station functions, such as switching and routing, coding and modulation, and decoding and demodulation, as well as radio frequency filtering, frequency conversion and amplification.

Figure 2:
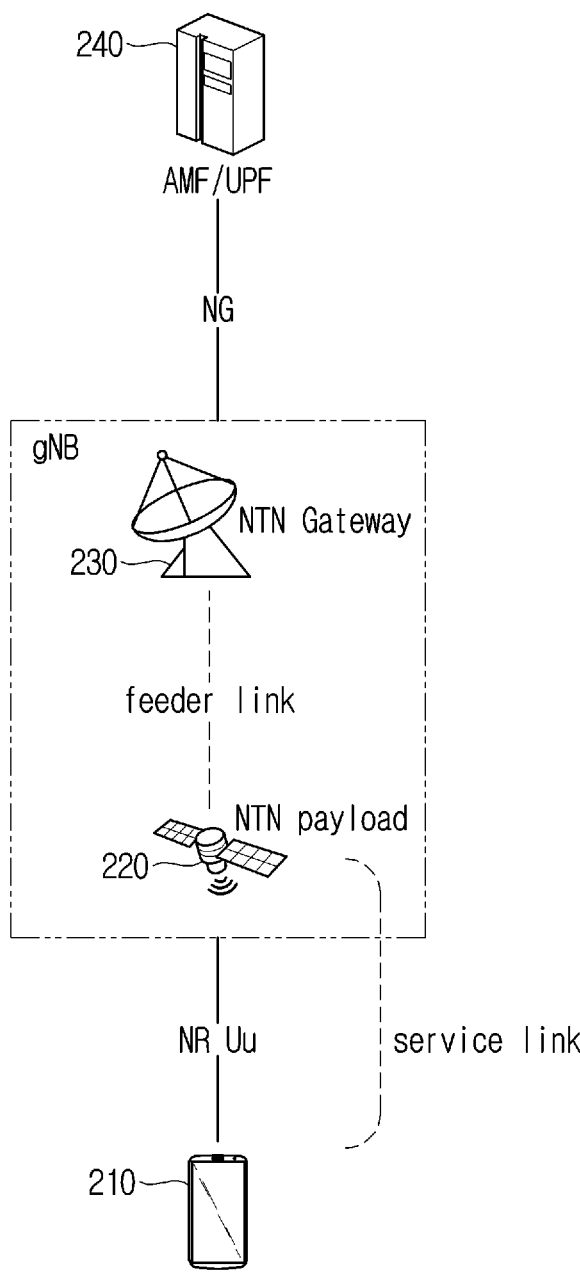
FIG. 2 illustrates another example of a system supporting satellite communication according to an embodiment of the present disclosure.

FIG. 2 illustrates another example of a system supporting satellite communication according to an embodiment of the present disclosure. FIG. 2 illustrates an example of an NTN that provides non-terrestrial connectivity to a terminal 210 using an NTN payload 220 and an NTN gateway 230. Here, a link between the NTN payload 220 and the terminal 210 is a service link and may be based on an Uu interface. A link between the NTN payload 220 and the NTN gateway 230 is a feeder link. A link between the NTN gateway 230 and AMF/UPF 240 may be based on an NG interface. The NTN payload 220 may transparently forward the wireless protocol received from the terminal 210 through the service link to the NTN gateway 230. Similarly, the NTN payload 220 may transparently forward the wireless protocol received from the NTN gateway 230 through the feeder link to the terminal 210.

To this end, the following connectivity may be supported by the NTN payload 220. A base station may serve multiple NTN payloads. The NTN payload may be served by multiple base stations.

The NTN payload 220 may change a carrier frequency before retransmitting data on the service link. That is, the NTN payload 220 may use different carrier frequencies in the service link and the feeder link. For NTN, as a network identifier, at least one of AMF name, NCGI (NR cell global identifier), CgNB identifier (ID), global gNB ID, TAI (tracking area identity), S-NSSAI (Single Network Slice Selection Assistance information), Network Slice AS Group (NSAG), Network Identifier (NID), Closed Access Group (CAG) ID or Local NG-RAN node ID may be used, and additionally, a Mapped Cell ID may be further used. Here, the tracking area may correspond to a fixed geographical area.

Non-Geosynchronous orbit (NGSO) includes low earth orbit at an altitude of about 300 km to 1500 km and medium earth orbit at an altitude of about 7000 km to 25000 km.

The service links may be classified into the following three types: earth-fixed type, quasi-earth-fixed type, and earth-moving type. The earth-fixed type provides beam(s) continuously covering the same geographic area at all times. For example, a satellite with a geosynchronous orbit (GSO) may provide a earth-fixed type of service link. The quasi-earth-fixed type provides beam(s) continuously covering the same geographic area during a limited period of time, and provides beams covering different geographic areas during different periods of time. For example, a satellite with a non-geosynchronous orbit may provide a quasi-earth-fixed type of service link using steerable beams. The earth-moving type provides beams whose coverage area slides over the Earth's surface. For example, a satellite with a non-geosynchronous orbit may provide a earth-moving type of service link using fixed or steerable beams.

Using the satellites with the non-geosynchronous orbit, a base station may provide quasi-earth-fixed cell coverage or earth-moving cell coverage. Using the satellite with the earth synchronous orbit, the base station may provide earth-fixed cell coverage. For the non-geosynchronous orbit, a switch in the service link may refer to a change in serving satellite.

Pre-compensation by the terminal may be performed as follows. A network may broadcast common TA parameters and ephemeris information to a serving cell. Here, the common TA refers to an offset corresponding to a RTT between an NTN payload and a reference point (RP). Accordingly, before connecting to an NTN cell, the terminal will have information about a satellite orbit and common TA, and will also have a valid GNSS location. To achieve synchronization, before and while connecting to an NTN cell, the terminal may calculate a round trip time (RTT) of a service link based on the GNSS position and satellite orbit, and pre-compensate for a frame time difference between downlink and uplink (e.g., TTA).

The terminal may calculate a frequency Doppler shift in consideration of the terminal's location and satellite orbit. When the terminal does not have a valid GNSS location and/or a valid satellite orbit, the terminal will not be able to communicate with the network until it obtains a valid GNSS location and a valid satellite orbit. In a connection mode, the terminal may continuously update TA and frequency pre-compensation. The terminal may be configured to report TA during a random access procedure or in a connection mode. In the connection mode, event-triggered TA reporting may be supported.

While pre-compensation of the instantaneous Doppler shift experienced in the service link is performed by the terminal, management of the Doppler shift and transponder frequency error experienced in the feeder link may be performed by implementation of the satellite network.

Operations and maintenance (O&M) requirements are as follows. The following NTN-related parameters may be provided by O&M to the base station providing non-terrestrial connectivity. For example, orbital information depicting coordinates or orbital trajectory information of an NTN satellite may be provided. Orbital information may be provided upon a request of the base station or may be provided on a regular basis. As formats of orbital information, two different sets may be supported. A first set contains satellite location and velocity state vectors, i.e., location and velocity. A second set includes at least one of semi-major axis, eccentricity, argument of periapsis, longitude of ascending node, inclination or mean anomaly. In addition, location information of NTN gateways and additional degrees for enabling base station operation for feeder/service link switches may further be provided.

Information related to the orbit of the satellite and the location of the NTN gateway may be used for at least one of uplink timing or frequency synchronization. In addition, information related to the orbit of the satellite and the location of the NTN gateway may also be used for mobility management purposes and random access. NTN-related parameters provided to the base station by O&M may depend on the type of service link supported (e.g., earth-fixed beam, quasi-earth-fixed beam, moving beam, etc.).

FIG. 3 illustrates a configuration of an apparatus in a system supporting satellite communication according to an embodiment of the present disclosure. The apparatus of FIG. 3 may be understood as a partial structure of any one of the apparatuses described with reference to FIG. 1, for example, the terminal 110, the satellites 120-1 and 120-2, and the gateway 130.

Referring to FIG. 3, the apparatus may include a processor 310, a communication unit 320 and a memory 330.

The processor 310 may control the overall functions and operations of the apparatus. The processor 310 may include an application-specific integrated circuit (ASIC), other chipsets, logic circuits, and/or data processing devices.

The communication unit 320 is connected to the processor 310 to transmit and receive wireless signals. The communication unit 320 may include a baseband circuit for processing wireless signals. For example, the communication unit 320 may include a short-range communication unit, a mobile communication unit, and a broadcast reception unit. In one embodiment, the communication unit 320 may transmit and receive data with other apparatuses, such as base stations, satellites, etc.

The memory 330 is hardware that stores various data processed by the processor 310. For example, the memory 330 may store an SIR value for a transmission target terminal of a transmission terminal and information about the transmission target terminal group for each transmission terminal. Additionally, the memory 330 may store applications, drivers, etc. to be run by the processor 310. The memory 330 may include a random access memory (RAM) such as a dynamic random access memory (DRAM) or a static random access memory (SRAM), a read-only memory (ROM), an electrically erasable programmable read-only memory (EEPROM), and a CD-ROM, a Blu-ray or other optical disk storage, a hard disk drive (HDD), a solid state drive (SSD), or a flash memory.

The structure of FIG. 3 may be understood as at least part of a terminal, base station, satellite, and gateway. When the structure of FIG. 3 is part of a satellite, the satellite may further include other hardware devices necessary for orbital flight in addition to the components illustrated in FIG. 3. When the structure of FIG. 3 is part of a gateway or base station, the gateway or base station may further include components supporting wired communication, etc.

The processor 310 described with reference to FIG. 3 may control the communication unit 320 and the memory 330, thereby controlling the apparatus to perform operations according to various embodiments described later.

According to one embodiment, the processor 310 may receive first information about an elevation angle for supporting satellite communication and second information about a beam center, determine coverage of the beam based on the first information and the second information, determine a distance between the terminal and the beam center based on the second information, and select a serving beam for the terminal (UE) based on the coverage of the beam and distance.

According to one embodiment, the first information and the second information are received through system information, and the system information may further include at least one of a carrier frequency for supporting satellite communication for the terminal (UE), a subcarrier spacing, a minimum elevation angle, and a maximum elevation angle, preamble information, a satellite altitude, or a location of a beam center. In addition, the second information includes information about the location of the beam center transmitted by the satellite, the first information has a different value depending on the movement of the satellite, and the serving beam may be determined in consideration of coverage of the beam with a different size depending on the elevation angle.

According to one embodiment, each of the carrier frequency and subcarrier spacing vary depending on the frequency range (FR) set in the UE, and the subcarrier spacing supported in FR1 is 15, 30, or 60 kHz, and the subcarrier spacing supported in FR2 is 60 KHz or 120 kHz, and the serving beam may be determined in consideration of the coverage of the beam with a different size depending on the frequency band set in the UE.

According to one embodiment, the coverage of the beam varies depending on the subcarrier spacing set for the UE, the frequency range, and the elevation angle depending on movement of the satellite, and the coverage of the beam may change to ½ as the subcarrier spacing increases from N to 2N, and the beam coverage may change to ⅓ as the frequency range increases from M to 2M. In addition, the serving beam may be selected in consideration of the elevation angle depending on movement of the satellite.

FIGS. 4A and 4B are diagrams illustrating a fixed beam cell and a moving beam cell provided by a satellite in system supporting satellite communication according to an embodiment of the present disclosure. FIG. 4A illustrates a fixed beam cell, and FIG. 4B illustrates a moving beam cell. Referring to FIG. 4A, when a fixed beam cell is provided, even if the satellite 420 moves, the location and size of the beam coverage formed on the ground may not substantially change. Referring to FIG. 4B, when a moving beam cell is provided, as the satellite 420 moves, the location of the beam coverage formed on the ground may move together.

FIG. 5 illustrates the simulation results of Doppler shift that may occur for each carrier frequency in a communication system supporting satellite communication according to an embodiment of the present disclosure. FIG. 5 illustrates the Doppler shift between a UE located on the ground and a satellite providing coverage on the ground for each carrier frequency. In the simulation to obtain the result of FIG. 5, for example, the satellite is set to fly at an altitude of 600 km, and the frequency is selected within FR1 (frequency range 1). In FIG. 5, the satellite is closest to the center of the beam at a point in time of about 780 seconds. Being located closest to the center of the beam may be understood as a state in which the elevation angle of the beam direction with respect to the ground is closest to a right angle. As can be seen in FIG. 5, the farther the satellite is from the center of the beam, the greater the Doppler shift occurs, and the size of the Doppler shift varies depending on the frequency even at the same point in time. The Doppler shift, which may occur as shown in FIG. 5, may affect communication quality. Therefore, compensation for the Doppler shift is necessary. For compensation in the downlink, a pre-compensation method may be used. The pre-compensation method may be performed as shown in FIG. 6 below.

FIG. 6 illustrates the concept of pre-compensation for Doppler shift in a communication system supporting satellite communication according to an embodiment of the present disclosure.

Referring to FIG. 6, a satellite 620 forms beam coverage on the ground, and a UE 610 is located within the beam coverage. According to one embodiment, the low earth orbit satellite 620 receives reference time information from multiple GNSS satellites and calculates the location of the low earth orbit satellite itself and the beam center. The low earth orbit satellite may then calculate and compensate for the Doppler shift for the beam center 602 and then transmit the compensated signal. If the UE 610 is not located at the beam center, a difference may occur between the actual Doppler shift and the compensated Doppler shift.

In the present disclosure, the difference between the actual Doppler shift and the compensated Doppler shift, that is, a residual Doppler value due to imperfection of compensation resulting from not being located at the beam center, may be referred to as residual Doppler shift (RDS), residual Doppler value, differential Doppler, etc. When RDS occurs, the UE 610 may calculate and compensate for the RDS. In this case, the satellite 620 has the advantage of not having to compensate for the Doppler shift for all UEs located at different points within the beam coverage. In addition, because the RDS is very small compared to the Doppler shift, measuring and compensating for it is not a large burden on the UE 610.

In FIG. 6, the beam center 602 refers to a point where the central axis of a beam radiating toward the ground contacts the ground. Therefore, the beam center 602 may be understood as the center of coverage. Hereinafter, in the present disclosure, the beam center may be referred to as 'coverage center', 'cell center', or other terms having equivalent technical meaning. In particular, the beam center according to the present disclosure may be referred to as a reference location that defines the cell center. Furthermore, various embodiments related to beam center information will be described in more detail below.

As mentioned above, the characteristics of the Doppler shift and residual Doppler shift may vary depending on frequency and location within coverage. The presence of Doppler shift and residual Doppler shift affects communication performance. As an example, communication performance may be measured by bit error rate (BER), and the relationship between BER and Doppler frequency will be explained as follows.

Figure 7A:
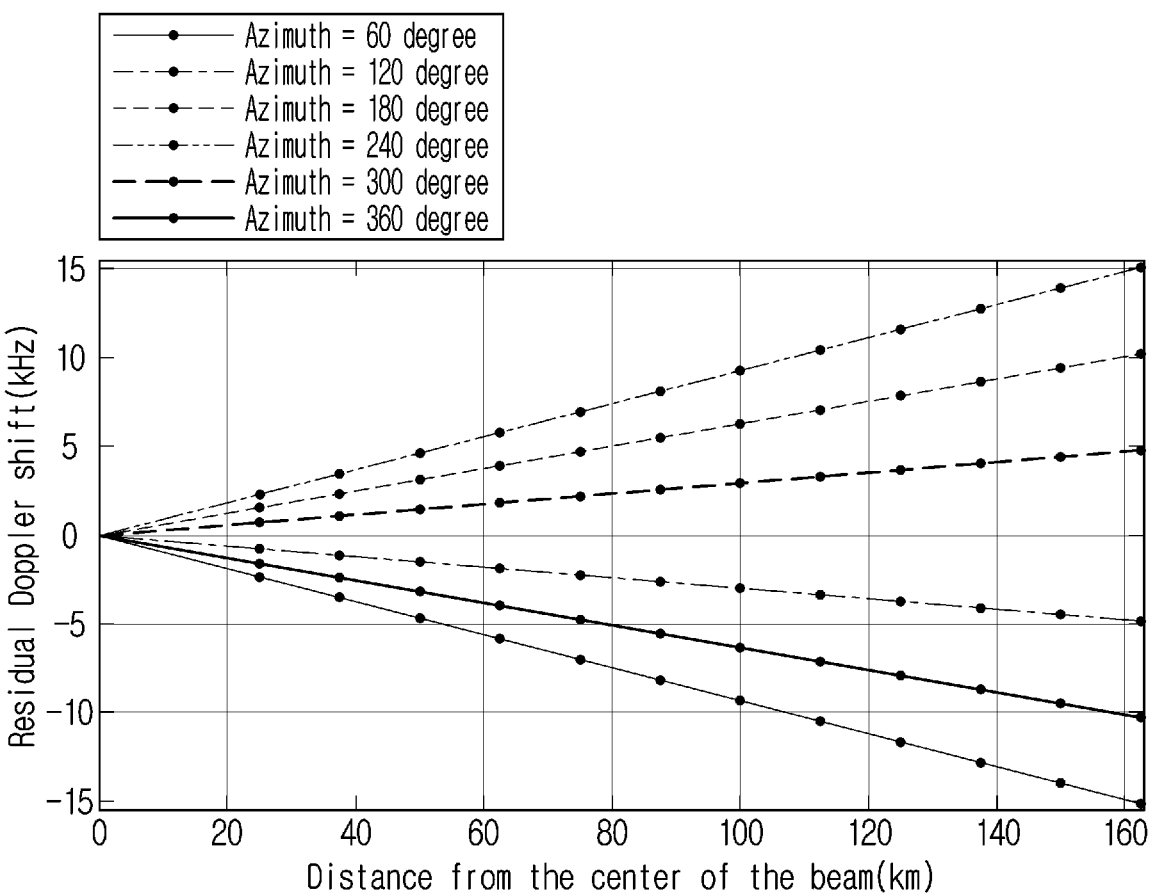
Figure 7B:
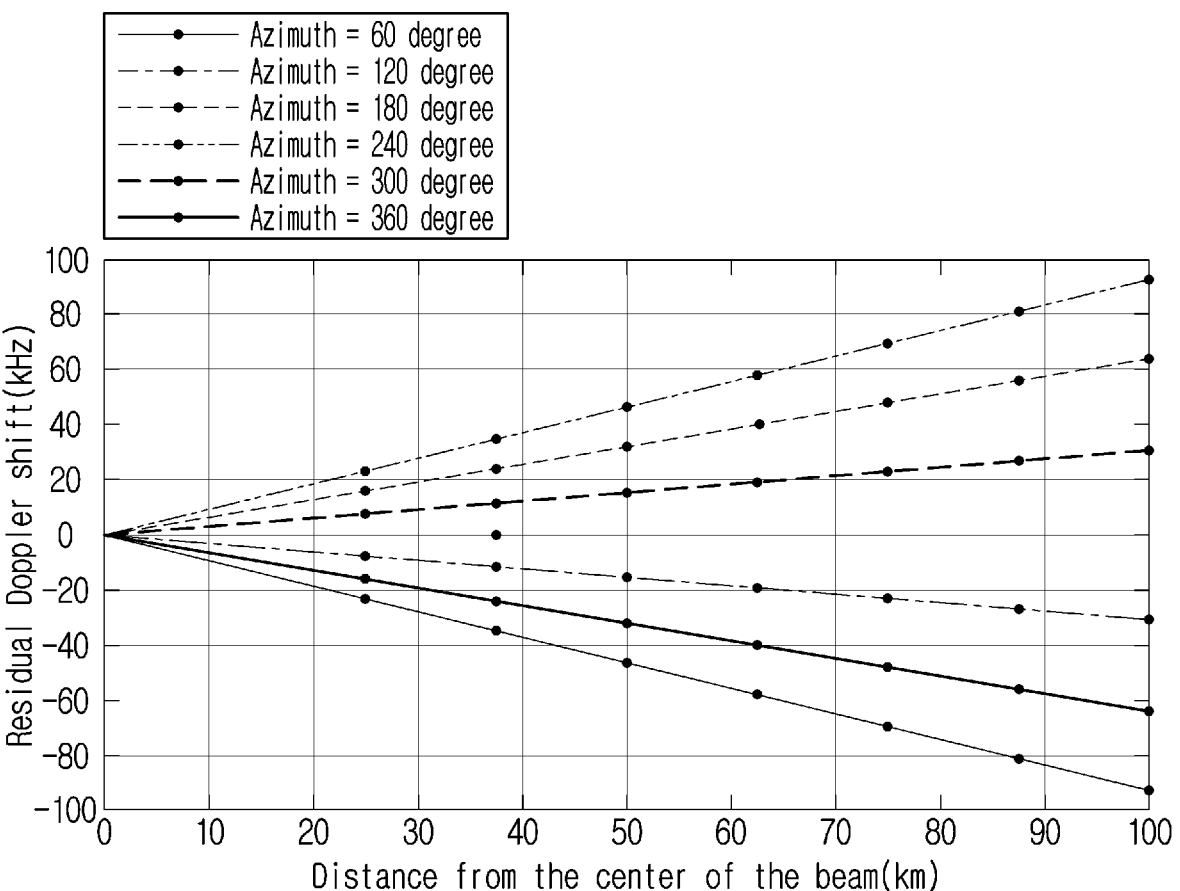
Figure 7C:
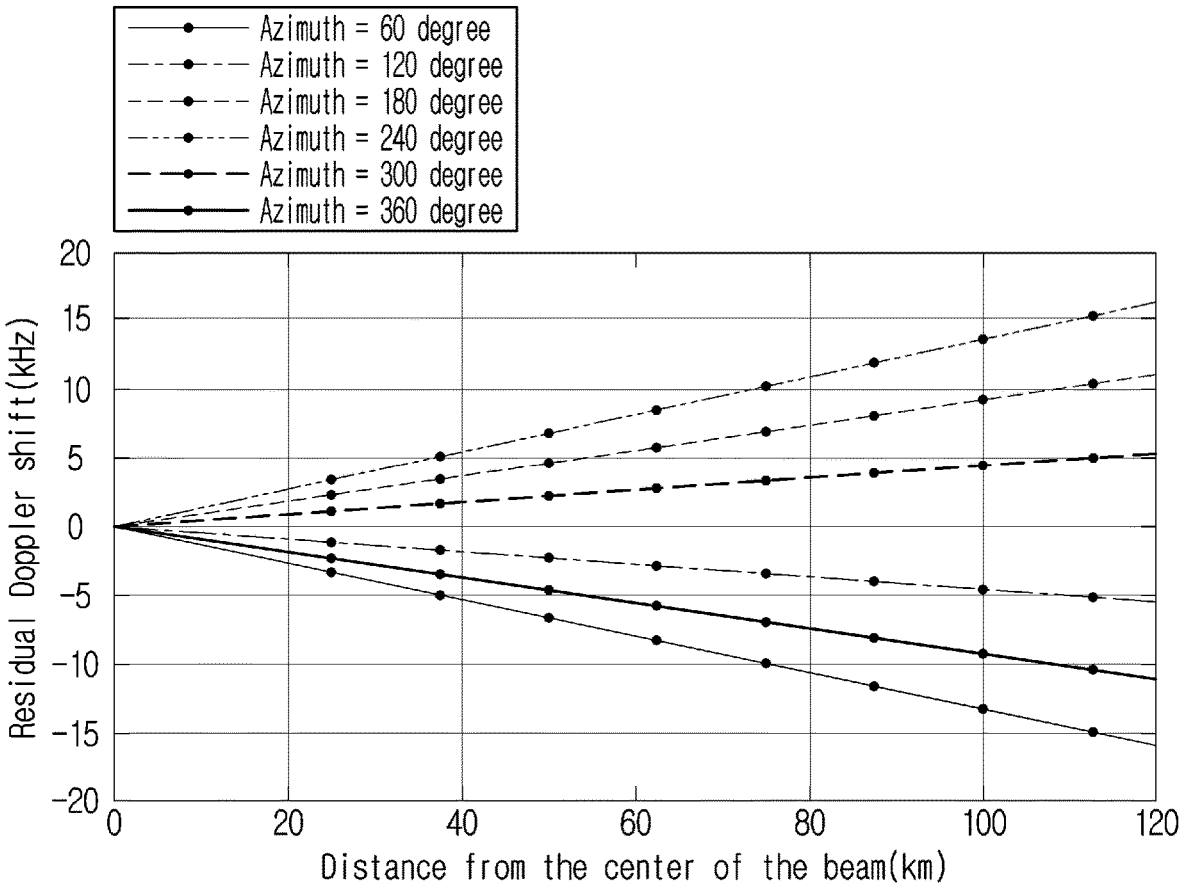
Figure 7D:
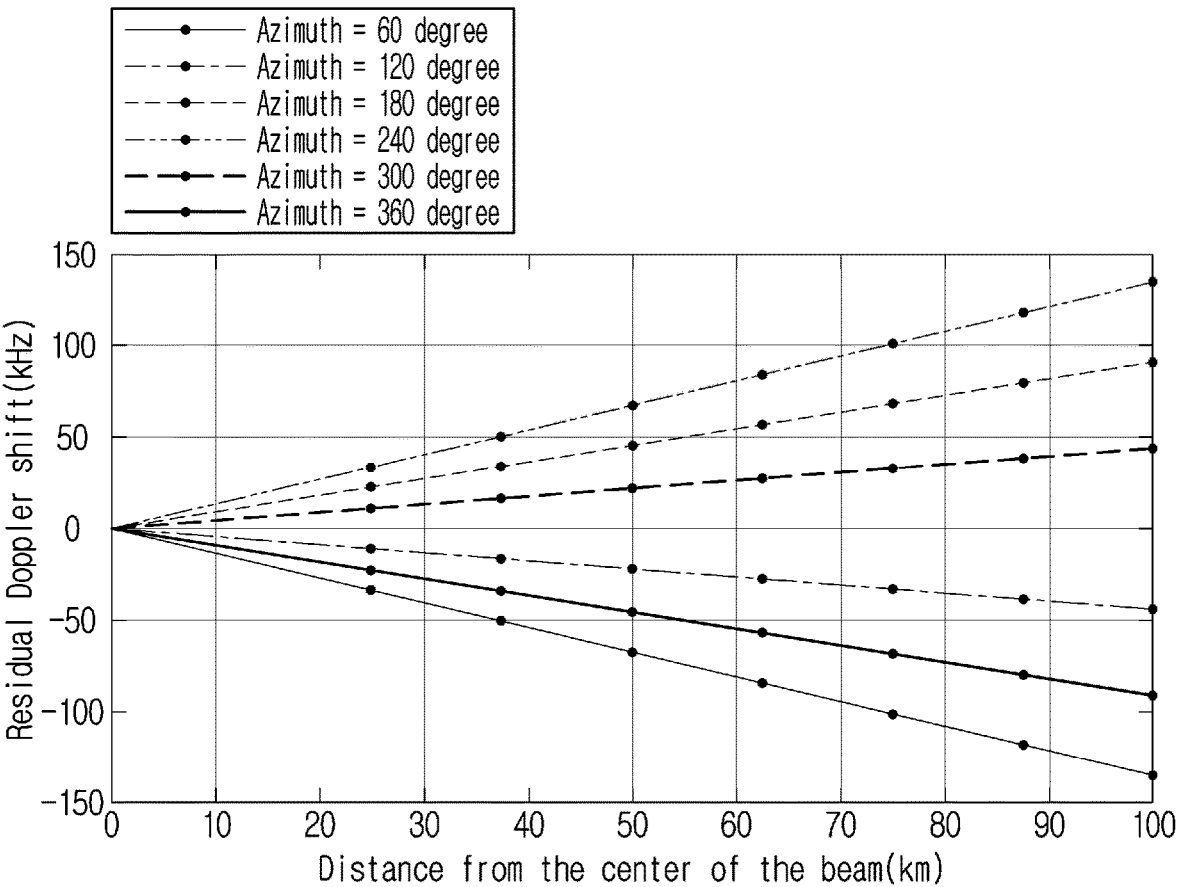

FIGS. 7A to 7D illustrate changes in residual Doppler shift (RDS) depending on a distance from a beam center in a communication system supporting satellite communication according to an embodiment of the present disclosure. Referring to FIGS. 7A and 7B, when the satellite is moving at an altitude of 550 km, FIGS. 7C and 7D illustrate a change in RDS when the satellite is moving at an altitude of 450 km. FIGS. 7A, 7B, 7C, and 7D all illustrate experimental results when the center frequency is 2 and 20 GHz. Referring to FIGS. 7A to 7D, it can be seen that the absolute value of RDS gradually increases as the distance from the beam center increases.

FIG. 8 illustrates a change in bit error rate (BER) according to a distance from a beam center in a communication system supporting satellite communication according to an embodiment of the present disclosure. FIG. 8 illustrates a change in BER according to the distance from the beam center for various subcarrier spacings (SCSs). First, looking at the change in BER, it can be seen that when the distance from the beam center increases beyond a certain level, the BER increases rapidly. In addition, the higher the satellite's altitude and the larger the SCS, the greater a critical distance at which the BER increases rapidly. This shows the possibility of adjusting the boundary of coverage where BER is maintained below a certain level by changing the altitude of the satellite or changing the SCS.

Based on this relationship, the beam size may be variably controlled depending on the satellite network environment. That is, according to various embodiments, the beam size may be adjusted according to the carrier frequency and SCS. Alternatively, in a situation where the carrier frequency and SCS are determined, the beam size may be determined based on the given carrier frequency and SCS.

FIG. 9 illustrates a difference in residual Doppler shift (RDS) according to a location within coverage in a communication system supporting satellite communication according to an embodiment of the present disclosure. In FIG. 9, a satellite 920 moves to the right, forming beam coverage on the ground. In beam coverage, when comparing three points: a beam center 902, a vertical beam edge 904, and a horizontal beam edge 906, the RDS at the beam center 902 is the smallest, and the RDS at the horizontal beam edge 906 is the largest. The RDS at the vertical beam edge 904 is greater than the RDS at the beam center 902 and less than the RDS at the horizontal beam edge 906. Therefore, the characteristics of RDS experienced by the UE may vary depending on the location of the UE within the coverage.

FIG. 10 illustrates a comparison of patterns of Doppler shift at a beam center and a beam edge in a communication system supporting satellite communication according to an embodiment of the present disclosure. FIG. 10 shows Doppler shift patterns according to satellite movement at the beam center, horizontal beam edge, and vertical beam edge, respectively. The difference between the three Doppler shift patterns may be understood as a difference in RDS. Based on the Doppler shift pattern at the beam center, the Doppler shift pattern at the horizontal beam edge has a larger difference than at the vertical beam edge. This occurs because points in time when the elevation angle for the satellite at each point is maximized are different from each other.

FIG. 11 illustrates a residual Doppler shift for each carrier frequency of a satellite occurring at a beam edge located in a direction perpendicular to a moving direction of a satellite in a communication system supporting satellite communication according to an embodiment of the present disclosure. FIG. 11 shows RDS patterns according to satellite movement at a horizontal beam edge and a vertical beam edge. Referring to FIG. 11, it can be seen that the size of the RDS at the horizontal beam edge is larger than that of the RDS at the vertical beam edge.

FIG. 12 illustrates a maximum residual Doppler shift depending on a distance from a beam center in a communication system supporting satellite communication according to an embodiment of the present disclosure. FIG. 12 shows the maximum residual Doppler shift according to the distance from the beam center schematized by linear regression. Referring to FIG. 12, the maximum RDS has a linear distribution over distance regardless of the carrier frequency. This shows the possibility of estimating the RDS based on the distance from the beam center, based on a linear relationship.

Considering the limitations of maximum likelihood (ML) estimation and the characteristics of RDS, the semi-major axis of beam coverage with beam robustness against the Doppler effect may be derived.

FIG. 13 illustrates a semi-major axis of effective beam coverage according to carrier frequency and SCS in a communication system supporting satellite communication according to an embodiment of the present disclosure.

Since the maximum RDS has a linear relationship with respect to the distance from the beam center, the semi-major axis of the beam coverage may be determined. The smaller the carrier frequency is and the larger the SCS is, the larger the semi-major axis of the beam coverage is. Based on this relationship, the beam size may be variably controlled depending on the satellite network environment. That is, according to various embodiments, the beam size may be adjusted according to the carrier frequency and SCS. Alternatively, in a situation where the carrier frequency and SCS are determined, the beam size may be determined based on the given carrier frequency and SCS.

As mentioned above, the carrier frequency and SCS affect the beam size or coverage size at which BER is maintained below a certain level. Accordingly, the satellite may signal information related to the carrier frequency and/or SCS and beam size or coverage size to a UE trying to access the satellite or a UE accessing the satellite. Here, specific formats and values of information related to the carrier frequency and/or SCS and beam size or coverage size may be defined in various ways. In addition, the timing at which the information related to the carrier frequency and/or SCS and beam size or coverage size is transmitted may also be defined in various ways.

In a satellite network, the size of beam coverage provided by a beam transmitted from a satellite may vary depending on the elevation angle to the satellite at the beam center within the coverage. In general, when the elevation angle is maximum, the size of the beam coverage is smallest, and as the elevation angle increases, the size of the beam coverage also increases.

FIG. 14 illustrates a change in elevation angle according to movement of a satellite in a communication system supporting satellite communication according to an embodiment of the present disclosure. Referring to FIG. 14, as the satellite moves over time, the elevation angle to the satellite at the beam center within the coverage changes. At this time, the Doppler shift and RDS are shown in FIGS. 15 and 16 below.

FIG. 15 illustrates a change in Doppler shift for each distance from a beam center to a beam edge according to movement of a satellite in a communication system supporting satellite communication according to an embodiment of the present disclosure. FIG. 15 shows the change in Doppler shift observed in the same situation when the change in elevation angle due to movement of the satellite is the same as in FIG. 14. Referring to FIG. 15, it can be seen that a slope change varies depending on the distance from the beam center. In addition, it can be seen that that the absolute value of the Doppler shift becomes the minimum at the timing when the elevation angle at each point is largest, and that the absolute value of the Doppler shift increases as the satellite moves and the elevation angle decreases.

FIG. 16 illustrates a change in residual Doppler shift according to a distance from a beam center to a beam edge as the satellite moves in a communication system supporting satellite communication according to an embodiment of the present disclosure. FIG. 16 shows the change in RDS observed in the same situation when the change in elevation angle due to the movement of the satellite is the same as in FIG. 14. Referring to FIG. 16, it can be seen that the maximum value varies depending on the distance from the beam center. Also, it can be seen that the RDS is maximum at the timing when the elevation angle at each point is largest, and that the RDS decreases as the satellite moves and the elevation angle decreases.

According to the relationship between the above-described elevation angle and Doppler shift/RDS, it is possible to optimize the size of effective cell coverage by changing the SCS depending on movement of the satellite. For example, an example of when the SCS is changed is shown in [Table 1] below.

TABLE 1

| Carrier frequency | SCS: elevation angle at which it changes from 60 to 120 Hz | Reliable beam size |
|---|---|---|
| 20 GHz | 43 | 100 → 60 km |
| 25 GHz | 39 | 100 → 50 km |
| 30 GHz | 36 | 100 → 40 km |
| 35 GHz | 34 | 100 → 30 km |
| 40 GHz | 31 | 100 → 30 km |
| 45 GHz | 29.9 | 100 → 30 km |
| 50 GHz | 28.5 | 100 → 20 km |
| 55 GHz | 27.2 | 100 → 20 km |

As mentioned above, the elevation angle of the satellite to the beam center and SCS affect the size of coverage at which BER is maintained below a certain level. Accordingly, the satellite may signal information related to the elevation angle and/or SCS and beam size or coverage size to the UE trying to access the satellite or accessing the satellite. Here, specific formats and values of information related to elevation angle and/or SCS and beam size or coverage size may be defined in various ways. Additionally, the timing at which information related to elevation angle and/or SCS and beam size or coverage size is transmitted may also be defined in various ways.

That is, according to one embodiment, coverage may be determined or calculated based on the elevation angle. Here, the elevation angle may be determined based on the reference location of the cell (e.g., the center of the cell). In other words, the coverage provided by the satellite is elevation-dependent coverage, and the elevation-dependent coverage can be formulated based on at least one of the elevation angle or the center location.

As seen earlier, the size of coverage (hereinafter referred to as 'effective coverage size' or 'beam size') where BER is maintained below a certain level may vary depending on the state of the satellite (e.g., the elevation angle of the satellite) and the characteristics of the signal transmitted from the satellite (e.g., the carrier frequency, SCS, etc.). Information about the effective coverage size may be used in various ways. For example, the effective coverage size may be used for cell selection of the UE. Hereinafter, various embodiments of selecting a cell based on the effective coverage size will be described.

FIG. 17 illustrates an initial access procedure in a communication system supporting satellite communication according to an embodiment of the present disclosure. FIG. 17 illustrates a signaling procedure between a terminal (user equipment (UE)) 1710 and a base station (gNB).

Referring to FIG. 17, in step S1701, for initial access of the UE 1710, the gNB 1720 transmits SSBs through beam sweeping. Each of the SSBs may include a PSS/SSS and a PBCH. The PSS/SSS is a signal that has one of pre-arranged sequences for synchronization, and the PBCH includes a master information block (MIB).

In step S1703, the gNB 1720 transmits remaining minimum system information (RMI) and other system information (OSI). The RMI and OSI are system information other than the MIB. The RMI includes system information transmitted without a request of the UE 1710, and the OSI includes system information transmitted upon request according to an on-demand method of the UE 1710. Contains information. That is, although not shown in FIG. 17, the request of the UE 1710 may be transmitted to the gNB 1720 prior to transmitting the OSI. Steps S1701 and S1703 may be performed repeatedly through beam sweeping, and at this time, the UE 1710 may perform beam selection.

Thereafter, in step S1705, the UE 1710 transmits a random access preamble based on the system information received in step S1703. In step S1707, the gNB 1720 transmits a random access response (RAR) message in response to the random access preamble. In step S1709, the UE 1710 performs scheduled transmission through resources indicated by the RAR. In step S1711, the gNB 1720 transmits a contention resolution message. Thereafter, in step S1713, the UE 1710 transmits a message for radio resource control (RRC) setup. Accordingly, a connection establishment procedure may be performed.

As described with reference to FIG. 17, the UE may select an appropriate beam through a beam management operation during the initial access procedure. At this time, for pre-compensation and RDS-based beam configuration, the UE performing initial access may use at least some of the information shown in [Table 2] below.

TABLE 2

| Item | Description |
|------|-------------|
| tracking area | Fixed on earth |
| Location information of UE | It can be obtained using GNSS technology. However, it is not limited thereto and location information obtained or determined by other methods may also be used. |
| Satellite identification information | ID or index. It may be provided to the UE through system information or dedicated RRC signaling. |
| Altitude of low earth orbit | It may be checked based on satellite identification information |

Additionally, at least some of the beam-related information illustrated in [Table 3] below may be signaled to the UE.

TABLE 3

| Item | Description |
|------|-------------|
| Carrier frequency | Carrier frequency used by satellite |
| Subcarrier spacing | Subcarrier spacing applied to signals transmitted by satellite |

The carrier frequency information or subcarrier spacing information illustrated in [Table 3] may be forwarded to the UE through any one of the various signaling described with reference to FIG. 17. For example, carrier frequency information may be forwarded through a system information block (SIB). Specifically, the carrier frequency information may be included in any one of the downlinkConfigCommon information element (IE) included in SIB1 and the IEs included in SIB3. In addition, subcarrier spacing information may be forwarded through MIB or SIB. Specifically, subcarrier spacing information may be included in subCarrierSpacingCommon IE included in MIB and ServingCellConfigCommon IE included in SIB1. Carrier frequency information and subcarrier spacing information may be obtained through IEs other than the listed IEs. In existing systems, subcarrier spacing information included in MIB may be used to perform initial access. In addition, carrier frequency information included in SIB may be used to set signal processing operations for communication or for cell reselection. On the other hand, according to various embodiments of the present disclosure, subcarrier spacing information and carrier frequency information may be used to select a beam.

That is, based on at least some of the information such as [Table 2] and [Table 3], the UE may determine a reliable beam size and a distance between the UE and the beam center. Additionally, the UE may determine whether the UE is located within an effective coverage area and whether to use the corresponding beam as a serving beam. That is, the UE perform beam selection. A specific embodiment for beam selection is as follows.

More specifically, the UE checks elevation-dependent coverage as coverage of a cell or beam based on the SCS, the elevation angle of the satellite, and the reference location of the cell. In particular, the UE may receive information about the beam center through at least one of RRC, MIB or SIB. Information about the beam center may include, for example, epoch time information, parameters for accessing the satellite, information about the reference location of the serving cell, or information for predicting the reference location of the serving cell, as information related to the satellite. As an example, the information about the reference location may be determined in consideration of distance information between the UE and the satellite, information that may be defined based on the carrier frequency, information determined in consideration of the cell identifier, information defining the beam center, coverage center, and cell center, etc. For example, cell coverage, cell size, or beam size may vary in consideration of the elevation angle of the satellite, orbital information, and characteristics of signals transmitted from the satellite.

FIG. 18 illustrates an example of a beam selection procedure according to an embodiment of the present disclosure. FIG. 18 shows a method of operating a UE.

Referring to FIG. 18, in step S1801, the UE receives system information of the satellite. Here, the satellite operates as a base station, and the system information includes a MIB included in an SSB and at least one SIB received through a physical downlink share channel (PDSCH). Specifically, the UE may detect a synchronization signal through a cell search operation, receive and decode the MIB included in the SSB including the synchronization signal, and receive and decode at least one SIB using information obtained through the MIB. At this time, the synchronization signal, MIB, and SIB may be transmitted through any one of a plurality of beams used by the satellite, and the beam carrying the synchronization signal, MIB, and SIB received by the UE is treated as a candidate beam for subsequent operations. By receiving system information, the UE may obtain information necessary for subsequent operations. For example, the UE may obtain subcarrier spacing information and carrier frequency information.

In step S1803, the UE determines a beam size. In other words, the UE determines the size of the beam carrying system information among at least one beam that may currently be received. That is, the UE may determine the size of the effective coverage of the beam currently being monitored. To this end, the UE may utilize a relationship of the radius of effective beam coverage of at least one of carrier frequency, subcarrier spacing, RDS, or satellite altitude. Specifically, the UE may determine a maximum RDS based on the satellite's orbit or altitude and carrier frequency, and determine a reliable maximum beam size, that is, the size of effective coverage, based on the maximum RDS and sub-carrier spacing. Additionally, the UE may further consider the elevation angle of the satellite. In other words, the angle at which the beam enters the ground varies depending on the elevation angle of the satellite, and the size or shape (e.g., circle, ellipse) of coverage may vary accordingly. Accordingly, the UE may determine the size of the effective coverage based on at least one of the carrier frequency, subcarrier spacing, RDS, satellite altitude, and elevation angle.

In step S1805, the UE determines a distance from the beam center. In other words, the UE checks how far the UE is from the beam center. To this end, the UE may use the location information of the UE. That is, the UE may acquire the location information of the UE, check the center location of a candidate beam, and then determine a distance between the location of the UE and the location of the beam center. Here, the location of the beam center may be checked in various ways. According to one embodiment, the location of the beam center may be checked based on a previously known satellite orbit and satellite identification information. According to other embodiments, the location of the beam center may be signaled explicitly or implicitly through system information.

In step S1807, the UE determines whether the UE is located within the effective coverage of the beam. To this end, the UE compares the size of the beam determined in step S1803 and the distance from the beam center determined in step S1805. That is, if the distance from the beam center is less than or equal to the radius of coverage according to the size of the beam, the UE may determine that the UE is located within the effective coverage of the beam.

If the UE is located within the effective coverage of the beam, in step S1809, the UE selects the corresponding beam. In other words, the UE selects to use the beam carrying system information as the serving beam. That is, the UE may decide to perform a random access operation later using the corresponding beam.

On the other hand, if the UE is not located within the effective coverage of the beam, the UE returns to step S1801. Accordingly, the UE may search for another beam of the satellite or another satellite, and repeat the above-described operations for the other searched beam.

According to the embodiment described with reference to FIG. 18, the UE may select a serving beam. To this end, the UE uses the location of the currently observed candidate beam center. As described above, the location of the beam center may be checked in a variety of ways. For example, the location of the beam center may be checked based on the area in which the UE is currently located. When placement of satellite base stations is determined, the locations of beam centers transmitted by the corresponding satellite base stations may be fixedly determined. In other words, if satellite base stations are placed on the ground, the locations of beam centers transmitted from the satellite may be fixedly determined using the satellite base stations. Since the beam coverage of the satellite base station is larger than that of a terrestrial base station, a corresponding relationship between the area and the location of the beam center may be derived. In this case, a corresponding relationship with the location of the beam center for each area may be predefined, and the UE may use information about the corresponding relationship to check the location of the beam center from the area in which it is currently located.

FIG. 19 shows an example of a procedure for obtaining information for beam selection according to an embodiment of the present disclosure. FIG. 19 shows a method of operating a UE.

Referring to FIG. 19, in step S1901, the UE receives a MIB. Through the MIB, the UE may obtain system information. For example, the UE obtain information on at least one of system frame number, subcarrier spacing, subcarrier offset, demodulation reference 1 (DMRS) type, physical downlink control channel (PDCCH) configuration for SIB1, or whether the cell is bared.

In step S1903, the UE transmits a request for SIB. The UE may request the satellite to transmit the SIB in order to receive the SIB transmitted using an on-demand method. To this end, the UE may receive SIB1 based on information included in the MIB (e.g., PDCCH configuration for SIB1) and obtain information about a random access channel from SIB1. In addition, the UE may transmit a signal for a SIB request through the random access channel.

In step S1905, the UE may receive at least one SIB. That is, the UE may receive at least one SIB transmitted by the satellite in response to the request transmitted in step S1903. Through at least one SIB, the UE may obtain various information necessary to perform communication. In particular, according to an embodiment of the present disclosure, the UE may obtain information for beam selection, for example, information about the carrier frequency. Furthermore, the UE may further obtain other information necessary to determine the distance from the location of the beam center.

FIG. 20 illustrates an example of a procedure for obtaining subcarrier spacing information according to an embodiment of the present disclosure. FIG. 20 shows a method of operating a UE.

Referring to FIG. 20, in step S2001, the UE detects a synchronization signal. The location of the frequency axis where the synchronization signal may be transmitted is predefined. Accordingly, the UE may detect a primary synchronization signal (PSS) and a secondary synchronization signal (SSS) consisting of one of predefined sequences at locations on the predefined frequency axis. By detecting the synchronization signal, the UE may determine the structure of the SSB.

In step S2003, the UE receives the MIB and decodes the MIB. The UE may receive the MIB received along with a DMRS through a physical broadcast channel (PBCH) included in the SSB. The UE may decode the MIB using channel information estimated based on the DMRS. By decoding the MIB, the UE may obtain parameters indicating information about the cell. At this time, the parameters may include a parameter indicating the subcarrier spacing.

In step S2005, the UE checks subcarrier spacing information based on a frequency range (FR). FR is a unit that distinguishes frequencies used in the system to which the UE and satellite belong, and may be divided into, for example, FR1 (e.g., 417 to 7,125 MHz) and FR2 (e.g., 24,250 to 52,600 MHz). Supportable subcarrier spacings may vary depending on the FR, and therefore, the interpretation of the value of the parameter indicating the subcarrier spacing may vary depending on the FR to which the frequency at which the MIB is received belongs. For example, if the frequency at which the synchronization signal is detected and the MIB is received belongs to FR1, the UE may interpret the subcarrier spacing as 15 kHz or 30 KHZ depending on the value of the parameter. For example, if the frequency at which the synchronization signal is detected and the MIB is received belongs to FR2, the UE may interpret the subcarrier spacing as 60 kHz or 120 k HZ depending on the value of the parameter.

According to the above-described embodiments, the UE may obtain necessary information and select an appropriate beam based on the obtained information and predefined information. At this time, in order to select a beam, it may be required to determine the coverage of the corresponding beam. For example, coverage may be determined or formulated based on elevation angle. Here, the elevation angle may be determined based on the reference location of the cell (e.g., the center of the cell). In other words, the coverage provided by the satellite is elevation-dependent coverage, and the elevation-dependent coverage can be formulated based on at least one of the elevation angle or the center location.

According to another embodiment of the present disclosure, carrier frequency information, subcarrier spacing information, and beam center location information may also be signaled through system information. In this case, the information signaled through system information is shown in [Table 4] below.

TABLE 4

| Item | Description |
| --- | --- |
| Location of beam center | Location of beam center transmitted by satellite |
| Carrier frequency | Carrier frequency used by satellite |
| Subcarrier spacing | Subcarrier spacing applied to signal transmitted by satellite |

FIG. 21 illustrates an example of a procedure for obtaining beam center location information according to an embodiment of the present disclosure. FIG. 21 shows a method of operating a UE. Referring to FIG. 21, in step S2101, the UE transmits a request for a SIB related to a satellite. That is, the SIB related to the satellite is transmitted using an on-demand method, and accordingly, the UE may request the satellite to transmit the corresponding SIB. To this end, the UE may request a SIB related to the satellite by transmitting a random access preamble. For example, the SIB related to the satellite may be a SIB containing satellite auxiliary information for NTN access.

In step S2103, the UE receives the SIB related to the satellite. For example, the UE may receive the SIB related to the satellite through a resource indicated by an RAR transmitted in response to a random access preamble for a system information request. As another example, the UE may transmit a message requesting a SIB through a resource indicated by an RAR transmitted in response to a random access preamble, and then receive the SIB related to the satellite. The SIB related to the satellite may include at least one of information about measurements of the satellite, information about NTN access, information about orbit, information about TA, information about synchronization, information about NTN neighboring cells, or information about reference location. In particular, according to one embodiment, the SIB related to the satellite may include information about the location of the beam center.

In step S2105, the UE checks the location of the beam center. That is, the UE may check the location of the beam center by interpreting information about the location of the beam center included in the received SIB. Information about the location of the beam center may indicate absolute location coordinates, or may indicate a location relative to other location information included in the SIB. Accordingly, the UE may select the beam using the location of the beam center.

As in the described embodiment, the UE may check the location of the beam center through the SIB. That is, the SIB may include information about the location of the beam center. For example, the SIB related to the satellite may include at least one of ephemeris data, common TA parameters, and HARQ-related offsets (e.g., k_offset), validity duration for uplink synchronization information, or epoch information, as parameters (e.g., ntn-Config) required by the UE to access NR via NTN access. In addition, the SIB related to the satellite may include time information (e.g., t-Service) about when a cell provided through the NTN quasi-earth fixed system stop a service for the area currently covered by the satellite. In addition, the SIB related to the satellite may include information that may be used for initiation of location-based measurement, as information about the reference location of the serving cell (e.g., referenceLocation) provided through the NTN quasi-earth fixed system. In addition, the SIB related to the satellite may include information used to initiate location-based measurement, as distance information (e.g., distanceThresh) from the serving cell reference location. Here, distance information may be used to determine candidate cells and rank candidate cells. In addition, the SIB related to the satellite may include information providing a list of NTN neighboring cells (e.g., ntn-NeighCellConfigList, lateNonCriticalExtension), and information on each satellite included in the list may include ntn-Config, carrier frequency, and cell identifier. (e.g., PhysCellId). In addition, the SIB related to the satellite may include center location information (e.g., centerOfCoverage) of the cell provided by the satellite.

Accordingly, the UE determines the beam size and serving beam by considering at least one of Tables 1 to 3, the parameters for NTN access described above, elevation angle, or reference information.

Accordingly, a serving beam for communication with the satellite may be selected based on the beam size. The information necessary to determine the above-described beam size and the information necessary to determine the location of the beam center may be provided by a satellite base station or at least one terrestrial base station. Here, the parameters for the UE may be set by a serving base station among satellite or terrestrial base stations that are connected to the UE, and connection of different serving base stations may be established depending on the service for the UE. As an example, the UE may be connected to a terrestrial base station to receive basic parameters for control and selectively receive necessary information through a satellite base station depending on the needs of the UE. In embodiments of the present disclosure, specific embodiments of which parameters are provided by a terrestrial base station or a satellite base station may vary depending on various embodiments or scenarios.

In addition, the UE determines the beam size in a situation where the subcarrier spacing and carrier frequency are given, and selects the beam based on the beam size. Furthermore, according to another embodiment, it is possible to change the beam size by changing at least one of the subcarrier spacing or the carrier frequency depending on the situation. For example, it is possible to dynamically control the beam size depending on the load of the current cell, the occurrence of coverage holes, etc. Depending on the change in beam size, the amount of available resources may be adjusted. Accordingly, provable services (e.g., ultra-reliable low latency (URL), enhanced mobile broadband (eMBB), etc.) may also change.

The various embodiments described above considered the case where the base station which may be accessed by the UE is a satellite base station. However, according to other embodiments, the above-described embodiments may be applied to a situation in which the UE may access not only a satellite base station but also a terrestrial base station, that is, a satellite-terrestrial integrated environment. In this case, more diverse operating scenarios may be applied.

FIGS. 22A to 22C illustrate simulation results for the semi-major axis of beam coverage according to satellite altitude in a communication system supporting satellite communication according to an embodiment of the present disclosure. The semi-major axis of beam coverage may mean an upper bound of beam size. For the simulation, the altitude was set to [300:50:1500] km, and the SCS was set to 15 kHz, 30 kHz, 60 kHz, and 120 KHz.

FIG. 22A shows the semi-major axis of beam coverage according to satellite altitude in a situation where SCS is 15 kHz or 30 kHz. Specifically, FIG. 22A shows the semi-major axis of beam coverage considering the Doppler shift $\Delta f_D$ for each maximum elevation angle when the SCS is 15 kHz or 30 kHz and the carrier frequency is 7 GHz. Referring to FIG. 22A, it can be seen that the semi-major axis of the beam coverage when the SCS is 30 kHz is larger than the semi-major axis of the beam coverage when the SCS is 15 kHz. In addition, in the case of the same SCS, it can be seen that the smaller the maximum elevation angle is, the larger the semi-major axis of the beam coverage is.

FIG. 22B shows the semi-major axis of beam coverage according to satellite altitude in a situation where SCS is 60 kHz. Specifically, FIG. 22B shows the semi-major axis of beam coverage considering the Doppler shift $\Delta f_D$ for each maximum elevation angle when the SCS is 60 kHz and the carrier frequency is 24 GHz or 52 GHZ. Referring to FIG. 22B, it can be seen that the semi-major axis of the beam coverage when the carrier frequency is 24 GHz is larger than the semi-major axis of the beam coverage when the carrier frequency is 52 GHz. In addition, in the case of the same carrier frequency, it can be seen that the smaller the maximum elevation angle is, the larger the semi-major axis of the beam coverage is.

FIG. 22C shows the semi-major axis of beam coverage according to satellite altitude in a situation where SCS is 120 KHz. Specifically, FIG. 22C shows the semi-major axis of beam coverage considering the Doppler shift $\Delta f_D$ for each maximum elevation angle when the SCS is 120 kHz and the carrier frequency is 24 GHz or 52 GHz. Referring to FIG. 22C, it can be seen that the semi-major axis of the beam coverage when the carrier frequency is 24 GHz is larger than the semi-major axis of the beam coverage when the carrier frequency is 52 GHz. Additionally, in the case of the same carrier frequency, it can be seen that the smaller the maximum elevation angle is, the larger the semi-major axis of the beam coverage is.

Referring to FIGS. 22A to 22C described above, it can be seen that the beam size considering the Doppler shift according to the embodiment of the present disclosure is proportional to the SCS and the altitude, and is inversely proportional to the carrier frequency and the maximum elevation angle.

According to the various embodiments described above, the UE may determine the beam size in a situation where the SCS, carrier frequency, altitude, and maximum elevation angle are given, and select a beam based on the beam size.

According to various embodiments of the present disclosure, in consideration of the high mobility of low earth orbit satellites, differential delay will be additionally considered. The differential delay may be limited by at least one of a maximum random access distance $D_{RA}$ or a maximum timing advance distance $D_{TA}$.

Therefore, according to an embodiment of the present disclosure, a method of determining the size of a beam for providing cells of a low earth orbit satellite network by considering differential delay is proposed. Specifically, hereinafter, various embodiments for determining and controlling a size of a beam for providing a cell of a low earth orbit satellite network in consideration of differential delay and signaling related information will be described.

FIG. 23A illustrates the concept of differential delay in a communication system supporting satellite communication according to an embodiment of the present disclosure.

Referring to FIG. 23A, a satellite 2220 forms beam coverage on the ground, and UEs 2210-1, 2210-2, and 2210-3 are located within the beam coverage. According to one embodiment, the satellite 2220 may be a low earth orbit satellite, and a distance between the UEs 2210-1, 2210-2, and 2210-3 within the beam coverage and the satellite and/or an elevation angle may be changed depending on the location of the satellite 2220. At this time, if the elevation angle to the satellite at a point where the UE is located is a maximum elevation angle $\theta_{max}$, the distance between the satellite and the UE is a minimum distance $d_{min}$, and when the elevation angle to the satellite at the point where the UE is located is a minimum elevation angle $\theta_{min}$, the distance between the satellite and the UE is a maximum elevation angle $d_{max}$. The maximum elevation angle $\theta_{max}$, the minimum elevation angle $\theta_{min}$, the maximum distance $d_{max}$, and the minimum distance $d_{min}$ may vary depending on the location of the satellite.

As shown in FIG. 23A, each UE in the beam coverage may experience differential delay depending on the location of the satellite. For example, a signal received by the first UE 2210-1 at the beam coverage boundary at a first time point $t_{\theta min}$ when the satellite is located at a first location may experience Differential delay$_1$ 2231 and a signal received by the first UE 2210-1 at the beam coverage boundary at a second time point $t_{Nadir}$ when the satellite is located at a second location may experience Differential delay$_2$ 2232. Differential delay $\Delta D$ may be expressed as a difference between a maximum distance and a minimum distance depending on the location of the satellite.

According to an embodiment of the present disclosure, the differential delay $\Delta D$ is limited to have a value less than or equal to a maximum random access distance $D_{RA}$ and a maximum timing advance distance $D_{TA}$. For example, the differential delay shall be set to a value less than or equal to the smaller of $D_{RA}$ and $D_{TA}$.

As described above, the maximum random access distance $D_{RA}$ needs to be calculated to set the differential delay. Random access is a procedure performed to prevent collisions with other UEs when the UE initially accesses a network. The maximum random access distance $D_{RA}$ may be calculated based on a cyclic prefix (CP), a random sequence, and a guard time. This is because a preamble format for random access is configured as shown in FIG. 23B.

FIG. 23A illustrates the concept of differential delay in a communication system supporting satellite communication according to an embodiment of the present disclosure. FIG. 23B illustrates the format of a random access preamble in a communication system supporting satellite communication according to an embodiment of the present disclosure.

Referring to FIGS. 23A and 23B, the random access preamble may include a Cyclic Prefix (CP) 2301, a random sequence 2303, and a guard time 2305. The guard time 2305 is set to allow for timing uncertainty due to a distance between the UE and the base station (satellite).

In the present disclosure, the maximum random access distance $D_{RA}$ may be calculated as shown in Equation 1 below.

$$D_{RA}(\mu) = c\frac{T_{GT}}{2} = c\frac{N_{slot}(\mu)T_{slot}(\mu) - T_{CP} - T_{SEQ}}{2} \qquad \text{[Equation 1]}$$

In [Equation 1], $D_{RA}$ ($\mu$) denotes a maximum random access distance, c denotes the speed of light, $T_{GT}$ denotes a guard time, $N_{slot}$ denotes the number of time slots in the preamble, and $T_{slot}$ denotes the length of a time slot. In addition, $T_{CP}$ denotes the length of a CP, and $T_{SEQ}$ denotes the length of a random sequence. Specifically, $T_{CP}$ may be $N_{CP} \cdot k \cdot 2^{-\mu}$ (k=64·0.509·10$^{-6}$[ms]), and $T_{SEQ}$ may be $N_{rep} \cdot 2048 \cdot k \cdot 2^{-\mu}$. $N_{rep}$ denotes the number of sequence repetitions. In addition, $T_{slot}$ is $2^{-\mu}$[ms] ($\mu$=0, 1, 2, 3). That is, $T_{slot}$ is 1 ms, 0.5 ms, 0.25 ms, or 0.125 ms, and in this case, SCS may be 15 kHz, 30 kHz, 60 kHz, or 120 kHz. In addition, $N_{slot}$ may be calculated by $N_{slot}(\mu)=[(T_{CP}+T_{SEQ})/$ $T_{slot}(\mu)]$. In addition, Tor may be expressed by $T_{GT}=N_{slot}(\mu)$ $T_{slot}(\mu)-T_{CP}-T_{SEQ}$. The reason why the denominator is 2 in [Equation 1] is to take round-trip delay into consideration.

The preamble format is divided into a long preamble and a short preamble. [Table 5] and [Table 6] show the PRACH short preamble formats for FR1 and FR2.

TABLE 5

| Format | Number of Repetitions | CP Length ($\mu$s) | Preamble Length ($\mu$s) Excluding CP |
|---|---|---|---|
| A1 | 2 | 9.4 | 133 |
| A2 | 4 | 18.7 | 267 |
| A3 | 6 | 28.1 | 400 |
| B1 | 2 | 7.0 | 133 |
| B2 | 4 | 11.7 | 267 |
| B3 | 6 | 16.4 | 400 |
| B4 | 12 | 30.5 | 800 |
| C0 | 1 | 40.4 | 66.7 |
| C2 | 4 | 66.7 | 267 |

[Table 5] shows the number of sequence repetitions $N_{rep}$, the CP length and the preamble length according to PRACH short preamble format.

TABLE 6

| Format | $L_{RA}$ | $\Delta f^{RA}$ | $N_\mu$ | $N_{CP}{}^{RA}$ | Support for restricted sets |
|---|---|---|---|---|---|
| A1 | 139 | $15 \cdot 2^\mu$ kHz | $2 \cdot 2048k \cdot 2^{-\mu}$ | $288k \cdot 2^{-\mu}$ | — |
| A2 | 139 | $15 \cdot 2^\mu$ kHz | $4 \cdot 2048k \cdot 2^{-\mu}$ | $576k \cdot 2^{-\mu}$ | — |
| A3 | 139 | $15 \cdot 2^\mu$ kHz | $6 \cdot 2048k \cdot 2^{-\mu}$ | $864k \cdot 2^{-\mu}$ | — |
| B1 | 139 | $15 \cdot 2^\mu$ kHz | $2 \cdot 2048k \cdot 2^{-\mu}$ | $216k \cdot 2^{-\mu}$ | — |
| B2 | 139 | $15 \cdot 2^\mu$ kHz | $4 \cdot 2048k \cdot 2^{-\mu}$ | $360k \cdot 2^{-\mu}$ | — |
| B3 | 139 | $15 \cdot 2^\mu$ kHz | $6 \cdot 2048k \cdot 2^{-\mu}$ | $504k \cdot 2^{-\mu}$ | — |
| B4 | 139 | $15 \cdot 2^\mu$ kHz | $12 \cdot 2048k \cdot 2^{-\mu}$ | $936k \cdot 2^{-\mu}$ | — |
| C0 | 139 | $15 \cdot 2^\mu$ kHz | $2048k \cdot 2^{-\mu}$ | $1024k \cdot 2^{-\mu}$ | — |
| C2 | 139 | $15 \cdot 2^\mu$ kHz | $4 \cdot 2048k \cdot 2^{-\mu}$ | $2048k \cdot 2^{-\mu}$ | — |

[Table 6] shows the sequence length $L_{RA}$, the subcarrier spacing $\Delta f^{RA}$, the random sequence length $N_\mu$ (or $T_{SEQ}$) and the length of the CP $$N_{CP}^{RA}$$

according to the preamble format. Here, $$N_{CP}^{RA}$$

may be equal to $T_{CP}$ in [Equation 1]. Here, the sequence length $L_{RA}$ being 139 means that it is a short sequence.

FIGS. 24A and 24B illustrate a maximum random access distance for each preamble format in a communication system supporting satellite communication according to an embodiment of the present disclosure. Referring to FIGS. 24A and 24B, the maximum random access distance $D_{RA}$ has always a minimum value when the preamble format is B4 regardless of OFDM numerology and has a maximum value when the preamble format is C0. This can be seen from Table 6 that when the preamble format is B4, the number of sequence repetitions is 12 and when the preamble format is C0, the number of sequence repetitions is 1.

According to an embodiment of the present disclosure, a maximum timing advance distance $D_{TA}$ needs to be calculated to set the differential delay. Timing advance is a procedure performed to prevent interference between uplink and downlink. The maximum timing advance distance $D_{TA}$ may be calculated based on the uplink and downlink relationship. FIG. 25 illustrates an uplink and downlink timing relationship in a wireless communication system. Referring to FIG. 25, a time interval TTA between an uplink frame 2510 and a downlink frame 2520 may be determined depending on a measurement value $N_{TA}$ transmitted to the UE through a timing advance command, a fixed value $N_{TA,offset}$ varying according to FR and SCS, and a basic time unit Tc of a 5G NR system. Therefore, the maximum timing advance distance $D_{TA}$ may be calculated as shown in Equation 2 below.

$$T_{TA}(\mu) = (N_{TA}(\mu) + N_{TA,offset})T_C \quad \text{[Equation 2]}$$

In [Equation 2], c denotes the speed of light. In addition, $N_{TA,offset}$ is a fixed value varying according to FR and SCS as described above and may use a value defined in the NR standard document TS 38.133 v15.6. In addition, $N_{TA}$ is a measurement value transmitted to the UE through the timing advance command and may be expressed by $N_{TA}(\mu)=T_A \cdot (16 \cdot 64)2^{-\mu}$. Here, $T_A=0, 1,2, \ldots, 3846$.

As described above, the differential delay $\Delta D$ may be restricted by the smaller of the maximum random access distance $D_{RA}$ and the maximum timing advance distance $D_{TA}$. Below, [Table 7] shows the maximum random access distance $D_{RA}$, and [Table 8] shows the maximum timing advance distance $D_{TA}$.

TABLE 7

| | $\mu = 0$ (15 kHz) | $\mu = 1$ (30 kHz) | $\mu = 2$ (60 kHz) | $\mu = 3$ (120 kHz) |
|---|---|---|---|---|
| $D_{RA}$ (km) | 133.84 | 66.92 | 33.46 | 16.73 |

[Table 7] shows the maximum random access distance when the preamble format is C0.

TABLE 8

| | $\mu = 0$ (15 kHz) | $\mu = 1$ (30 kHz) | $\mu = 2$ (60 kHz) | $\mu = 3$ (120 kHz) |
|---|---|---|---|---|
| $D_{TA}$ (km) | 603.48 | 302.79 | 152.45 | 77.27 |

[Table 8] shows the maximum timing advance distance when $T_A$ is 3846 and $N_{TA,offset}$ is 25,600 (FR1) or 13,795 (FR2).

Referring to [Table 7] and [Table 8], it can be seen that the maximum random access distance is smaller than the maximum timing advance distance. This indicates that the maximum random access distance $D_{RA}$ is a dominant parameter that has more influence on the differential delay than the maximum timing advance distance $D_{TA}$. However, this may be limited to a case where $T_A$ is greater than 146.

According to the differential delay according to the embodiment of the present disclosure may be expressed as shown in Equation 3 below.

$$\Delta D = d_{max}(\theta_{min}) - d_{min}(\theta_{max}) \leq D_{RA} \qquad \text{[Equation 3]}$$

[Equation 3] may be expressed as shown in [Equation 4] below.

$$d_{min}(\theta_{max}) \geq d_{max}(\theta_{min}) - D_{RA} = d_{min,t} \qquad \text{[Equation 4]}$$

In [Equation 4], $d_{min,t}$ denotes the minimum value of $d_{min}(\theta_{max})$.

Assuming that the beam radius according to the beam size of the satellite according to an embodiment of the present disclosure is a 2610 as shown in FIG. 26, the beam radius may be calculated using Equations 5 to 7 below. FIG. 26 shows the beam radius of a satellite in a wireless communication system according to an embodiment of the present disclosure.

First, a maximum distance $d_{min}(\theta_{max})$ between the UE and the base station, corresponding to the case where the elevation angle between the satellite and the UE is minimum, may be calculated as shown in Equation 5 below.

$$d_{max}(\theta_{min}) = R_E \left[ \sqrt{\left( \frac{R_E + h_{sat}}{R_E} \right)^2 - \cos^2 \theta_{min}} - \sin \theta_{min} \right] \qquad \text{[Equation 5]}$$

In [Equation 5], RE denotes the radius of the earth, and $h_{sat}$ denotes the altitude of the satellite.

In this case, the diameter 2a representing the beam size of the satellite may be calculated as shown in Equation 6 below.

$$2a = d_{max}(\theta_{min}) \cos \theta_{min} - d_{SSP} \qquad \text{[Equation 6]}$$

In [Equation 6], $d_{ssp}$ denotes a distance between a sub-satellite point and a UE closest to the satellite. The sub-satellite point means a location on the ground where the elevation angle with the satellite is a right angle.

According to [Equation 5] and [Equation 6] as described above, the radius of the beam may be calculated as in [Equation 7] below.

$$a = \frac{d_{max}(\theta_{min}) \cos \theta_{min} - \sqrt{d_{min,t}^2 - h_{sat}^2}}{2} \qquad \text{[Equation 7]}$$

Referring to [Equation 7], the beam size may be determined based on a maximum distance $d_{max}(\theta_{min})$ between the UE and the base station corresponding to the case where the elevation angle between the satellite and the UE is minimum, a minimum value $d_{min,t}$ of $d_{min}(\theta_{max})$ and the altitude $hs_{at}$ of the satellite.

FIGS. 27A and 27B illustrate simulation results for beam size according to satellite altitude in a communication system supporting satellite communication according to an embodiment of the present disclosure.

FIGS. 27A and 27B illustrate simulation results in which the beam size for each altitude of the satellite is determined using the maximum random access distance $D_{RA}$ in FR1. In particular, FIG. 27A shows the simulation result when the minimum elevation angle $\theta_{min}$ is 10°, and FIG. 27B shows the simulation result when the minimum elevation angle is 25°. Here, the beam size when the preamble format is C0 may mean a maximum upper bound of the beam size, and the beam size when the preamble format is B4 may mean a minimum upper bound of the beam size.

Referring to FIGS. 27A and 27B, it can be seen that the upper bound of the beam size when the minimum elevation angle is 25° is lower than the upper bound of the beam size when the minimum elevation angle is 10°. That is, the simulation results of FIGS. 27A and 27B show that the higher the minimum elevation angle is, the lower the upper bound is.

FIGS. 28A and 28B illustrate simulation results for beam size according to satellite altitude in a communication system supporting satellite communication according to an embodiment of the present disclosure.

FIGS. 28A and 28B show the simulation results in which the beam size for each altitude of the satellite is determined using the maximum random access distance $D_{RA}$ in FR2. In particular, FIG. 28A shows the simulation result of the case where the minimum elevation angle $\theta_{min}$ is 10°, and FIG. 28B shows the simulation result of the case where the minimum elevation angle is 25°. Here, the beam size when the preamble format is C0 may mean a maximum upper bound of the beam size, and the beam size when the preamble format is B4 may mean a minimum upper bound of the beam size.

Referring to FIGS. 28A and 28B, it can be seen that the maximum upper bound of the beam size when the minimum elevation angle is 25° is lower than the maximum upper bound of the beam size when the minimum elevation angle is 10°. It can be seen that the minimum upper bound of the beam size when the minimum elevation angle is 25° is lower than the minimum upper bound of the beam size when the minimum elevation angle is 10°. As such, according to an embodiment of the present disclosure, the upper bound of the beam size may vary depending on the minimum elevation angle of the satellite. In other words, according to an embodiment of the present disclosure, the beam size may be determined based on the minimum elevation angle of the satellite. That is, the beam coverage of the satellite may be determined based on the elevation angle (e.g., minimum elevation angle).

As described above, it can be seen that the preamble, SCS, minimum elevation angle, and satellite altitude affect the beam size to maintain the differential delay below a certain level. Accordingly, the satellite may signal information that affects the beam size (e.g., preamble, SCS, minimum elevation angle, and satellite altitude) to the UE trying to access the satellite or the UE accessing the satellite. This is for the UE trying to access the satellite to know the beam size of the satellite. Specific formats and values of information that affect the beam size may be defined in various ways, and their transmission time points may also be defined in various ways.

Based on the relationship described above, the beam size in a satellite network environment may be adaptively controlled. That is, hereinafter, a method of controlling a beam upper bound, that is, a maximum beam size, by combining the two approaches described above will be provided. Specifically, a method of controlling the beam upper bound based on the beam size in consideration of compensation for Doppler shift and the beam size in consideration of differential delay will be provided. For example, after determining a first beam size based on the carrier frequency, SCS, maximum elevation angle and satellite altitude and determining a second beam size based on the preamble, SCS, minimum elevation angle and satellite altitude, the smaller of the first beam size and the second beam size may be determined to be a final beam size upper bound.

FIG. 29 illustrates the concept of determining a final beam size upper bound in a communication system supporting satellite communication according to an embodiment of the present disclosure.

Referring to FIG. 29, the UE may obtain information 2910 that affects the beam size through signaling with at least one serving cell including a satellite or a base station. The information that affects the beam size may include a minimum elevation angle $\theta_{min}$ 2911, a preamble 2912, an SCS 2913, a satellite altitude 2914, a carrier frequency $f_c$ 2915, and a maximum elevation angle $\theta_{max}$ 2916.

The UE determines the beam upper bound $$R_{max}^{\Delta D}$$

2920 of the beam size considering the differential delay $\Delta D$ based on the first information set of the information 2910 affecting the beam size. The first information set may include at least one of the minimum elevation angle 2911, the preamble 2912, the SCS 2913, or the satellite altitude 2914.

In addition, the UE determines the beam upper bound $$R_{max}^{f_D}$$

2930 considering compensation for Doppler shift $f_D$ based on the second information set of the information 2910 affecting the beam size. The second information set may include at least one of the SCS 2913, the satellite altitude 2914, the carrier frequency 2915 or the maximum elevation angle 2916.

The UE determines the minimum value 2940 of the beam upper bound $$R_{max}^{\Delta D}$$

2920 considering the differential delay $\Delta D$ and the beam upper bound $$R_{max}^{f_D}$$

considering the compensation for the Doppler shift $f_D$ to be a final beam size upper bound.

According to one embodiment, the minimum elevation angle $\theta_{min}$ 2911 may be predetermined. For example, the minimum elevation angle $\theta_{min}$ 2911 may be predetermined to be 10° or 25°. This is only an example to aid understanding, and embodiments of the present disclosure are not limited thereto. For example, the minimum elevation angle may be predetermined to another value. In addition, the maximum elevation angle $\theta_{max}$ may be obtained from a SIB. For example, the maximum elevation angle $\theta_{max}$ may be obtained through the SIB as shown in FIG. 32.

FIGS. 30A to 30D illustrate simulation results for the semi-major axis of beam coverage according to satellite altitude in a communication system supporting satellite communication according to an embodiment of the present disclosure. The semi-major axis of the beam coverage may mean a beam size upper bound. For simulation, the minimum elevation angle was set to 10° or 25° (SpaceX(STAR-LINK)), and as the SCS, 15 kHz (μ=0) and 30 kHz (μ=1) were used for FR1, and 60 kHz (μ=2) and 120 kHz (μ=3) were used for FR2.

Figure 30A:
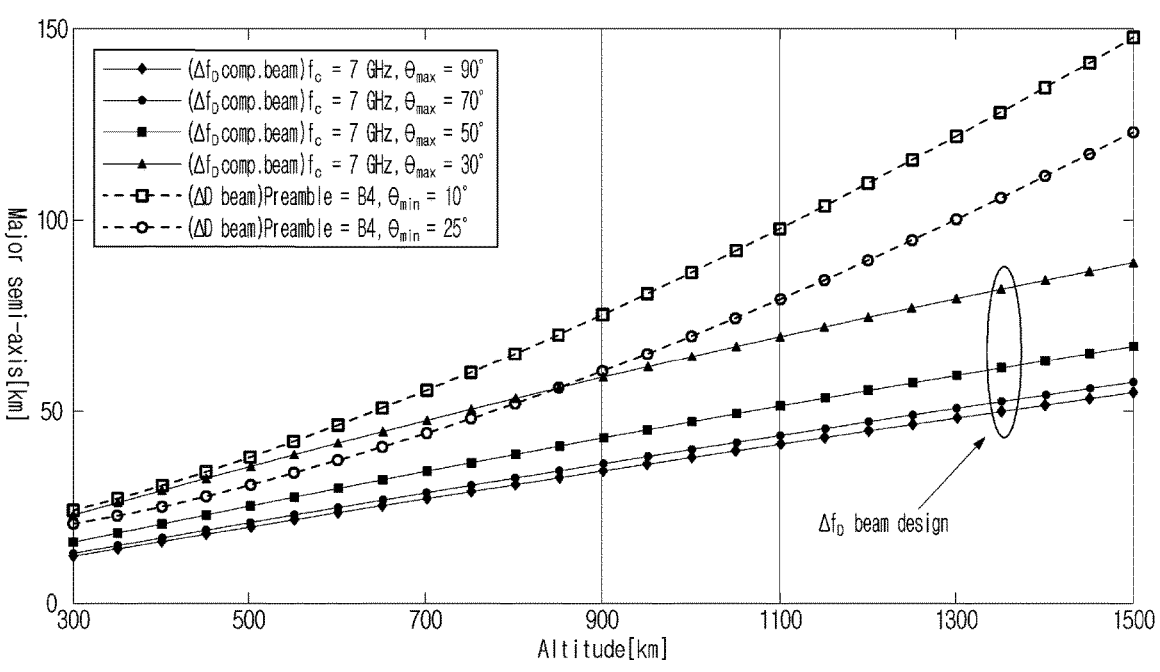

FIG. 30A shows the semi-major axis of beam coverage according to satellite altitude in a situation where the SCS is 15 kHz. Specifically, FIG. 30A shows the semi-major axis of the beam coverage considering the differential delay $\Delta D$ according to the minimum elevation angle when the preamble format is B4, and the semi-major axis of the beam coverage considering the Doppler shift $\Delta f_D$ for each maximum elevation angle when the carrier frequency $f_c$ is 7 GHz.

Referring to FIG. 30A, it can be seen that the semi-major axis of the beam coverage considering the Doppler shift $\Delta f_D$ is designed to be a final beam size regardless of the maximum elevation angle when the minimum elevation angle is 10°. In addition, it can be seen that the semi-major axis of the beam coverage considering the Doppler shift $\Delta f_D$ is designed to be a final beam size when the maximum elevation angle is 50°, 70° or 90° in the case where the minimum elevation angle is 25°. It can be seen that when the minimum elevation angle is 25° or the maximum elevation angle is 30°, the semi-major axis of the beam coverage considering differential delay $\Delta D$ is designed as the final beam size in the altitude range of about 300 km to about 875 km, and the semi-major axis of the beam coverage considering the Doppler shift $\Delta f_D$ is designed as the final beam size in the altitude range of about 876 km to about 1500 km.

Figure 30B:
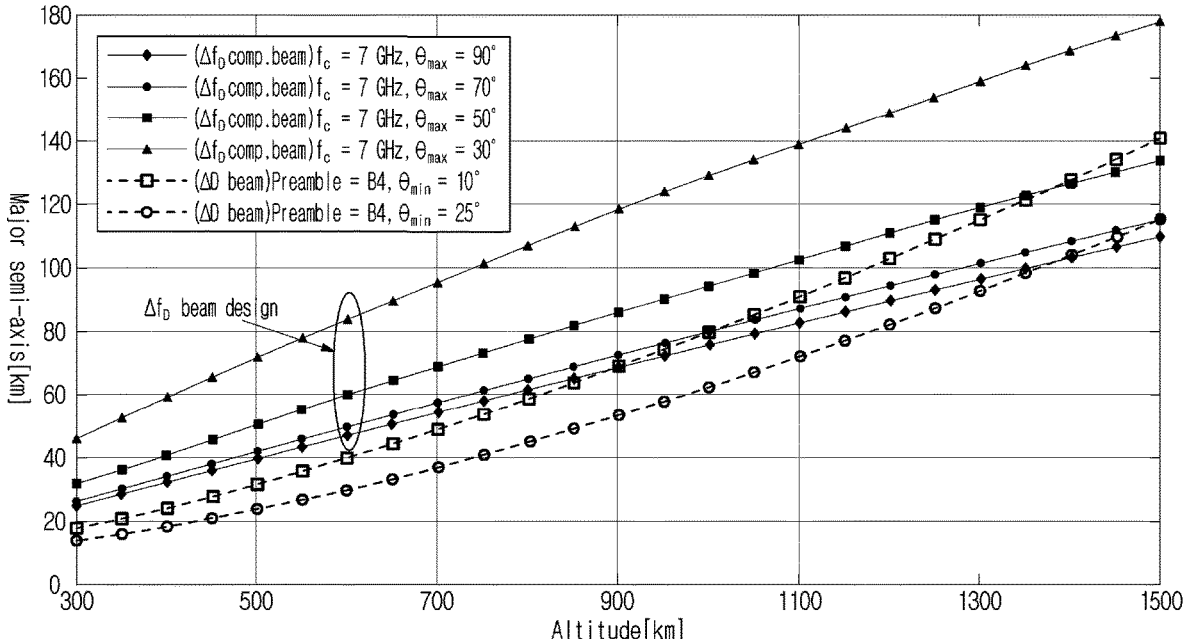

FIG. 30B shows the semi-major axis of the beam coverage according to satellite altitude in a situation where the SCS is 30 kHz. Specifically, FIG. 30B shows the semi-major axis of the beam coverage considering the differential delay $\Delta D$ according to the minimum elevation angle when the preamble format is B4, and the semi-major axis of the beam coverage considering the Doppler shift $\Delta f_D$ for each maximum elevation angle when the carrier frequency $f_c$ is 7 GHZ.

Referring to FIG. 30B, it can be seen that when the minimum elevation angle is 10°, the semi-major axis of the beam coverage considering the differential delay $\Delta D$ is designed as the final beam size in some altitude ranges, and the semi-major axis of the beam coverage considering the Doppler shift $\Delta f_D$ is designed as the final beam size in the other altitude range. That is, the semi-major axis of the beam coverage considering the Doppler shift $\Delta f_D$ is designed as the final beam size in the altitude range of about 1400 to 1500 km when the maximum elevation angle is 50°, in the altitude range of about 1050 to 1500 km when the maximum elevation angle is 70°, and in the altitude range of about 900 to 1500 km when the maximum elevation angle is 90°, and the semi-major axis of the beam coverage considering the differential delay ΔD is designed as the final beam size in the altitude range lower than the above ranges.

In addition, when the minimum elevation angle is 25°, the semi-major axis of the beam coverage considering the Doppler shift $\Delta f_D$ may be designed as the final beam size in the altitude range of about 1400 to 1500 km, and the semi-major axis of the beam coverage considering the differential delay ΔD may be designed as the final beam size in the lower altitude range.

Figure 30C:
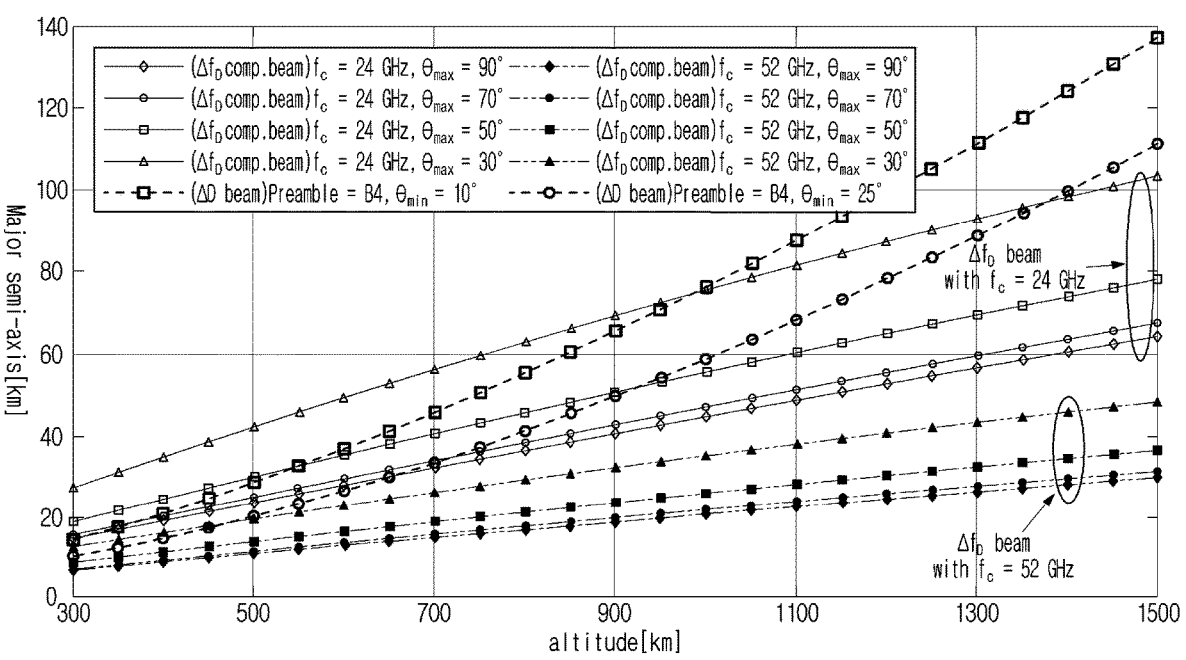

FIG. 30C shows the semi-major axis of beam coverage according to the satellite altitude in a situation in which the SCS is 60 kHz. Specifically, FIG. 30C shows the semi-major axis of the beam coverage considering the differential delay ΔD according to the minimum elevation angle when the preamble format is B4, and the semi-major axis of the beam coverage considering the Doppler shift $\Delta f_D$ for each maximum elevation angle when the carrier frequency $f_c$ is 24 GHZ or 52 GHz.

Referring to FIG. 30C, it can be seen that when the minimum elevation angle is 10° and the carrier frequency $f_c$ is 24 GHZ, the semi-major axis of the beam coverage considering the differential delay ΔD is designed as the final beam size in some altitude ranges, and the semi-major axis of the beam coverage considering the Doppler shift $\Delta f_D$ is designed as the final beam size in the other altitude range.

That is, the semi-major axis of the beam coverage considering the Doppler shift $\Delta f_D$ is designed as the final beam size in the altitude range of about 1000 km when the maximum elevation angle is 30°, in the altitude range of about 650 km when the maximum elevation angle is 50°, in the altitude range of about 400 km when the maximum elevation angle is 70° and in the altitude range of about 350 km when the maximum elevation angle is 90°, and the semi-major axis of the beam coverage considering the differential delay ΔD is designed as the final beam size in altitude range lower than the above ranges.

On the other hand, it can be seen that when the minimum elevation angle is 10° and the carrier frequency $f_c$ is 52 GHz, the semi-major axis of the beam coverage considering the Doppler shift $\Delta f_D$ is always designed as the final beam size regardless of the maximum elevation angle and altitude.

In addition, when the minimum elevation angle is 25° and the carrier frequency $f_c$ is 24 GHZ, the semi-major axis of the beam coverage considering the differential delay ΔD is designed as the final beam size in some altitude ranges, and the semi-major axis of the beam coverage considering the Doppler shift $\Delta f_D$ is designed as the final beam size in the other altitude range.

That is, the semi-major axis of the beam coverage considering the Doppler shift $\Delta f_D$ may be designed as the final beam size in the altitude range of about 1400 km or more when the maximum elevation angle is 30°, in the altitude range of about 950 km or more when the maximum elevation angle is 50°, in the altitude range of about 750 km when the maximum elevation angle is 70° and in the altitude range of about 700 km when the maximum elevation angle is 90°, and the semi-major axis of the beam coverage considering the differential delay ΔD may be designed as the final beam size in the altitude range lower than the above ranges.

On the other hand, it can be seen that when the minimum elevation angle is 25° and the carrier frequency $f_c$ is 52 GHz, the semi-major axis of the beam coverage considering the Doppler shift $\Delta f_D$ is always designed as the final beam size regardless of the altitude in a situation in which the maximum elevation angle is 50°, 70° or 90°, and the semi-major axis of the beam coverage considering the Doppler shift $\Delta f_D$ is designed as the final beam size in the altitude range of about 500 km or more in a situation in which the maximum elevation angle is 30°.

Figure 30D:
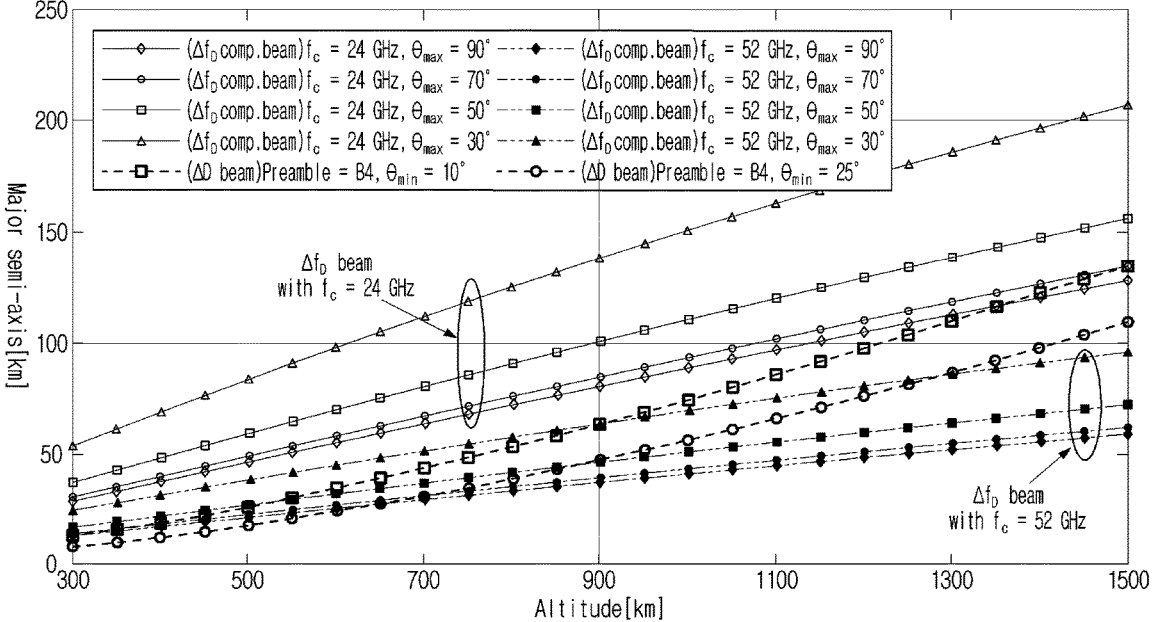

FIG. 30D shows the semi-major axis of beam coverage according to a satellite altitude in a situation in which the SCS is 120 kHz. Specifically, FIG. 30D shows the semi-major axis of the beam coverage considering the differential delay ΔD according to the minimum elevation angle when the preamble format is B4, and the semi-major axis of the beam coverage considering the Doppler shift $\Delta f_D$ for each maximum elevation angle when the carrier frequency $f_c$ is 24 GHZ or 52 GHz.

Referring to FIG. 30D, it can be seen that when the minimum elevation angle is 10°, the carrier frequency $f_c$ is 52 GHz and the maximum elevation angle is 90°, the semi-major axis of the beam coverage considering the Doppler shift $\Delta f_D$ is designed as the final beam size regardless of the altitude. On the other hand, it can be seen that when the minimum elevation angle is 10°, the carrier frequency $f_c$ is 52 GHz, and the maximum elevation angle is 30°, 50° or 70°, the semi-major axis of the beam coverage considering the differential delay ΔD is designed as the final beam size in some altitude ranges, and the semi-major axis of the beam coverage considering the Doppler shift $\Delta f_D$ is designed as the final beam size in the other altitude range.

Specifically, the semi-major axis of the beam coverage considering the Doppler shift $\Delta f_D$ is designed as the final beam size in the altitude range of about 950 km or more when the maximum elevation angle is 30°, in the altitude range of about 550 km or more when the maximum elevation angle is 50°, and in the altitude range of about 400 km when the maximum elevation angle is 70°, and the semi-major axis of the beam coverage considering the differential delay ΔD is designed as the final beam size in the altitude range lower than the above ranges.

In addition, it can be seen that when the minimum elevation angle is 10°, the carrier frequency $f_c$ is 24 GHZ, and the maximum elevation angle is 70° or 90°, the semi-major axis of the beam coverage considering the differential delay ΔD is designed as the final beam size in some altitude ranges, and the semi-major axis of the beam coverage considering the Doppler shift $\Delta f_D$ is designed as the final beam size in the other altitude range. Specifically, the semi-major axis of the beam coverage considering the Doppler shift $\Delta f_D$ may be designed as the final beam size in the altitude range of 1500 km or more when the maximum elevation angle is 70° and in the altitude range of 1500 km or more when the maximum elevation angle is 90°, and the semi-major axis of the beam coverage considering the differential delay ΔD may be designed as the final beam size in the altitude range lower than the above ranges.

In addition, it can be seen that when the minimum elevation angle is 10°, the carrier frequency $f_c$ is 24 GHZ, and the maximum elevation angle is 30° or 50°, the semi-major axis of the beam coverage considering the differential delay ΔD is designed as the final beam size regardless of the altitude.

In addition, it can be seen that when the minimum elevation angle is 25° and the carrier frequency $f_c$ is 52 GHz, the semi-major axis of the beam coverage considering the differential delay ΔD is designed as the final beam size in some altitude ranges according to the maximum elevation angle, the semi-major axis of the beam coverage considering the Doppler shift $\Delta f_D$ is designed as the final beam size in the other altitude range.

Specifically, the semi-major axis of the beam coverage considering the Doppler shift $\Delta f_D$ may be designed as the final beam size in the altitude range of about 1300 km or more when the maximum elevation angle is 30°, in the altitude range of about 900 km or more when the maximum elevation angle is 70°, in the altitude range of about 700 km when the maximum elevation angle is 70° and in the altitude range of about 650 km or more when the maximum elevation angle is 90°, and the semi-major axis of the beam coverage considering the differential delay ΔD may be designed as the final beam size in the other altitude range lower than the above ranges.

As described above, according to an embodiment of the present disclosure, the final beam size (or coverage size) of the satellite is determined based on at least one of the minimum elevation angle, the preamble format, the SCS, the altitude, the carrier frequency, or the maximum elevation angle, but may be limited by the beam size considering differential delay or the beam size upper bound considering compensation for the Doppler shift. Therefore, based on the beam upper bound, the UE may determine whether the UE is located within the effective coverage area and determine whether to use the corresponding beam as a serving beam. That is, the UE may perform beam selection. A specific embodiment for beam selection is as follows.

FIG. 31 illustrates an example of a beam selection procedure according to an embodiment of the present disclosure. FIG. 31 shows a method of operating a UE.

Referring to FIG. 31, in step S3101, a UE receives system information of a satellite. Here, the satellite operates as a base station, and the system information includes a MIB included in a SSB and at least one SIB received through a physical downlink share channel (PDSCH). Specifically, the UE may detect a synchronization signal through a cell search operation, receive and decode the MIB included in the SSB including the synchronization signal, and receive and decode the at least one SIB using information obtained through the MIB. At this time, the synchronization signal, the MIB, and the SIB may be transmitted through any one of a plurality of beams used by the satellite, and the beam carrying the synchronization signal, the MIB, and the SIB received by the UE is treated as a candidate beam for subsequent operations.

According to one embodiment, the SIB received by the UE may be a SIB related to the satellite. The SIB related to the satellite may include at least one of information about measurements of the satellite, information about NTN access, information about the orbit of the satellite, information about TA, information about synchronization, information about NTN neighboring cells, information about a reference location, information about the location of a beam center or information about a maximum elevation angle. By receiving system information, the UE may obtain information necessary for subsequent operations.

For example, the UE may obtain at least one of information affecting the beam size of the satellite through system information, that is, minimum elevation angle, preamble information, SCS, satellite altitude, carrier frequency, or maximum elevation angle. Here, the preamble information may include random access preamble-related information necessary to calculate the maximum random access distance, as shown in Equation 1. For example, the preamble information may include at least one of the number of time slots in the random access preamble, a time slot length, a CP length, the number of sequence repetitions, or a random sequence length.

In step S3103, the UE determines a first beam size based on a first information set. The first information set may include some of the information affecting the beam size shown in FIG. 29. Specifically, the first information set may include at least one of the minimum elevation angle $\theta_{min}$, the preamble information, the SCS, or the satellite altitude. For example, the UE may obtain the first information set through system information and determine a first beam size considering differential delay based on the first information set. The first beam size considering differential delay may be determined as described in Equations 1 to 7.

In step S3105, the UE determines a second beam size based on a second information set. The second information set may include some of the information affecting the beam size shown in FIG. 29. Specifically, the second information set may include at least one of the SCS, the satellite altitude, the carrier frequency $f_c$, or the maximum elevation angle $\theta_{max}$. For example, the UE may obtain the second information set through system information and determine a second beam size considering compensation for Doppler shift based on the second information set. For example, the UE may determine the second beam size considering compensation for Doppler shift in the same manner as described in S1803 of FIG. 18.

In step S3107, the UE determines a final beam size based on the first beam size and the second beam size. Specifically, the UE may determine the smaller of the first beam size and the second beam size as a final beam size. The final beam size may mean the effective coverage size of the beam that forwards system information to the UE.

In step S3109, the UE determines a distance from the beam center. In other words, the UE checks how far the UE is from the beam center. To this end, the UE may use the location information of the UE. That is, the UE may obtain location information of the UE, check the location of a candidate beam center, and then determine a distance between the location of the UE and the location of the beam center. Here, the location of the beam center may be checked in various ways. According to one embodiment, the location of the beam center may be checked based on a previously known satellite orbit and satellite identification information. According to other embodiments, the location of the beam center may be signaled explicitly or implicitly through system information. For example, the location of the beam center may be checked from the SIB as shown in Table 5 or Table 10.

In step S3111, the UE determines whether the UE is located within the effective coverage of the beam. To this end, the UE compares the final beam size determined in step S3107 and the distance from the beam center determined in step S3109. That is, if the distance from the beam center is less than or equal to the radius of coverage according to the final beam size, the UE may determine that the UE is located within the effective coverage of the beam.

If the UE is located within the effective coverage of the beam, in step S3113, the UE selects the corresponding beam. In other words, the UE selects to use the beam carrying system information as the serving beam. That is, the UE may decide to perform a random access operation later using the corresponding beam. On the other hand, if the UE is not located within the effective coverage of the beam, the UE returns to step S3101. Accordingly, the UE may search for another beam of the satellite or another satellite and repeat the above-described operations for the other searched beam.

According to the embodiment described with reference to FIG. 31, the UE may select a serving beam. To this end, the UE uses the location of the center of the currently observed candidate beam. As described above, the location of the center of the beam may be checked in a variety of ways. As an example, the location of the beam center may be checked based in which area the UE is currently located. When placement of satellite base stations is determined, the locations of the centers of the beams transmitted by the corresponding satellite base stations may be fixedly determined. In other words, if satellite base stations are placed on the ground, the locations of the centers of the beams transmitted from the satellite may be fixedly determined using the satellite base stations. Since the beam coverage of a satellite base station is larger than that of a terrestrial base station, a corresponding relationship between the area and the location of the beam center may be derived. In this case, a corresponding relationship with the location of the beam center for each area may be predefined, and the UE may use information about the corresponding relationship to check the location of the beam center from the area in which it is currently located. According to one embodiment, the UE may obtain location information of the beam center through system information.

In FIG. 31, the UE obtains at least one of information affecting the beam size through system information, for example, the minimum elevation angle, the preamble information, SCS, the satellite altitude, the carrier frequency, or the maximum elevation angle. According to one embodiment, at least one of information affecting the beam size may be obtained in the manner described in FIGS. 19 to 21. For example, the UE may obtain system information through the MIB, transmit a request for the SIB, and then receive the SIB, as described in FIG. 19. In addition, the UE may obtain the SCS as described in FIG. 20 and the beam center location information as described in FIG. 21.

According to one embodiment, at least one of the information affecting the beam size may be predetermined. For example, the minimum elevation angle $\theta_{min}$ may be predetermined. For example, the minimum elevation angle $\theta_{min}$ may be predetermined for each satellite type. As an example, the minimum elevation angle may be predetermined to be about 10° or about 25°. This is just an example to aid understanding, and the minimum elevation angle may be set to a different value. Additionally, the UE may obtain the maximum elevation angle $\theta_{max}$ through the SIB.

FIG. 32 illustrates an example of a procedure for obtaining a minimum elevation angle according to an embodiment of the present disclosure. FIG. 32 shows a method of operating a UE.

Referring to FIG. 32, in step S3201, the UE may check the type of satellite. The type of satellite may be obtained, for example, from the system information of the satellite. For example, the UE may receive system information including a SIB from a satellite operating as a base station, and the system information may include satellite type information. This is only an example, and the method of checking satellite type information is not limited to this.

In step S3203, the UE may check the minimum elevation angle. That is, the UE may determine the minimum elevation angle based on the type of satellite. For example, the UE may check the minimum elevation angle corresponding to the checked satellite type based on pre-stored information about the minimum elevation angle for each type of satellite. For example, if the satellite type is a first type, the UE may check that the minimum elevation angle is 10°. In addition, when the satellite type is a second type, the UE may check that the minimum elevation angle is 25°.

The procedure for obtaining the minimum elevation angle described above is only an example, and embodiments of the present disclosure are not necessarily limited thereto. For example, embodiments of the present disclosure may be equally applied even when the minimum elevation angle is determined through another method. Alternatively, according to another embodiment, the minimum elevation angle may be defined independent of the type of satellite.

FIG. 33 illustrates an example of a procedure for obtaining a maximum elevation angle according to an embodiment of the present disclosure. FIG. 33 shows a method of operating a UE.

Referring to FIG. 33, in step S3301, the UE transmits a request for a SIB related to a satellite. The UE may request the SIB related to the satellite by transmitting a random access preamble. For example, the SIB related to the satellite may be a SIB containing satellite auxiliary information for NTN access. Here, the SIB related to the satellite is transmitted using an on-demand method, and the on-demand method may refer to a method of requesting transmission of the corresponding SIB from the satellite and receiving it.

In step S3303, the UE receives the SIB related to the satellite. For example, the UE may receive the SIB related to the satellite through a resource indicated by an RAR transmitted in response to a random access preamble for a system information request. As another example, the UE may transmit a message requesting the SIB through the resource indicated by the RAR transmitted in response to the random access preamble, and then receive the SIB related to the satellite. The SIB related to the satellite includes at least one of information about measurements of the satellite, information about NTN access, information about the orbit of the satellite, information about TA, information about synchronization, information about NTN neighboring cells, information about the reference location, or information about the location of the beam center. In particular, according to one embodiment, the SIB related to the satellite may include information about the maximum elevation angle. Here, the maximum elevation angle may mean the maximum elevation angle of the earth-fixed beam with respect to the reference location included in the SIB.

In step S3305, the UE checks information about the maximum elevation angle. That is, the UE may check the maximum elevation angle for the reference location by interpreting the information about the maximum elevation angle included in the received SIB.

As in the embodiment described with reference to FIG. 33, the UE may check the maximum elevation angle through the SIB. In other words, the SIB includes information about the maximum elevation angle. For example, the SIB related to the satellite may include at least one of ephemeris data, common TA parameters, or HARQ-related offsets (e.g., k_offset), validity duration for uplink synchronization information, or epoch information, as parameters (e.g., ntn-Config) necessary for the UE to access the NR through NTN access. In addition, the SIB related to the satellite may include time information (e.g., t-Service) about a point in time when cells provided through the NTN quasi-Earth fixed system stops the service for the area currently covered by the satellite. In addition, the SIB related to the satellite may include information that may be used for initiation of location-based measurements, as information about the reference location of the serving cell (e.g., referenceLocation) provided through the NTN quasi-Earth fixed system. In addition, the SIB related to the satellite may include information used for initiation of location-based measurement, as distance information (e.g., distanceThresh) from the serving cell reference location. In addition, the SIB related to the satellite may include information providing a list of NTN neighboring cells (e.g., ntn-NeighCellConfigList, lateNon-CriticalExtension), and information on each satellite included in the list may include ntn-Config, carrier frequency, and cell identifier. (e.g., PhysCellId). In addition, the SIB related to the satellite may include center location information (e.g., centerOfCoverage) of the cell provided by the satellite. In addition, the SIB related to the satellite may include information about the maximum elevation angle of the satellite (e.g., maximumElevationAngle). In addition, in the above-described embodiment, the SIB related to the satellite is described as being transmitted using an on-demand method, but according to another embodiment of the present disclosure, the SIB related to the satellite may be defined to be transmitted without request. In this case, in the procedure illustrated in FIG. 33, step S3301 is omitted, and the UE may receive the SIB related to the satellite without a separate request. At this time, the UE may check scheduling information for the SIB related to the satellite and then receive the SIB related to the satellite based on the checked scheduling information.

According to the various embodiments described above, a serving beam for communication with the satellite may be selected based on the beam size. In the above-described embodiments, it has been described that the information necessary to determine the beam size and the information necessary to determine the location of the beam center are all received from the satellite base station. However, according to other embodiments, at least some of the information may be provided by a terrestrial base station. In this case, which parameters are provided by the terrestrial base station may vary depending on various embodiments or scenarios.

Meanwhile, it will be understood by those skilled in the art that various changes in form and details may be made therein without departing from the essential characteristics of the above description. Therefore, the disclosed methods should be considered in descriptive sense only and not for purposes of limitation. The scope of the disclosure is defined not by the detailed description of the disclosure but by the appended claims, and all differences within the scope will be construed as being included in the present disclosure.

Beams can be selected effectively in a non-terrestrial network (NTN) system using satellites.

More specifically, in a communication system supporting satellite communication, a serving cell and serving beam are selected in consideration of an effective beam and beam size based on information about a reference location of a cell, thereby selecting an optimal serving cell and serving beam considering a long delay time which is the characteristics of a conventional non-terrestrial radio access environment, a variable delay time and a large Doppler effect according to satellite movement.

This applies the protocols and communication procedures of the wireless communication system without any additional procedures, and an optimal cell and beam are selected in consideration of differences in access environments for each satellite type, wide beam coverage, large delay differences for each terminal location, moving cell location situation, and whether or not terminal location information is used, thereby providing the advantage of providing continuous service support.

What is claimed is:

1. A method of performing beam selection of a user equipment (UE) in a communication system supporting satellite communication with a satellite, the method comprising:

receiving first information about an elevation angle for supporting the satellite communication and second information about a beam center;

determining coverage of a beam based on the first information and the second information;

determining a first distance between the UE and the beam center based on the second information; and selecting a serving beam for the UE based on the coverage of the beam and the first distance, wherein the coverage of the beam is determined based on change characteristics of a residual Doppler value remaining after compensation based on the beam center, depending on a second distance from the beam center.

2. The method of claim 1, wherein the first information and the second information are received through system information, and wherein the system information further comprises at least one of a carrier frequency for supporting the satellite communication for the UE, a subcarrier spacing, a minimum elevation angle, a maximum elevation angle, preamble information, an altitude of the satellite or a location of the beam center.

3. The method of claim 2, wherein the second information comprises information about a center location of a beam transmitted by the satellite, wherein the first information has a different value depending on movement of the satellite, and wherein the serving beam is determined in consideration of the coverage of the beam having a different size depending on the elevation angle.

4. The method of claim 2, wherein each of the carrier frequency and the subcarrier spacing varies depending on a frequency range (FR) set in the UE;

wherein the subcarrier spacing supported in FR1 is 15, 30 or 60 kHz, wherein the subcarrier spacing supported in FR2 is 60 kHz or 120 kHz, and wherein the serving beam is determined in consideration of the coverage of the beam having a different size depending on a frequency band set in the UE.

5. The method of claim 2, wherein the coverage of the beam varies depending on the subcarrier spacing, a frequency band, the elevation angle depending on movement of the satellite, wherein the coverage of the beam changes to ½ as the subcarrier spacing increases from N to 2N, wherein the coverage of the beam changes to ⅓ as the frequency band increases from M to 2M, and wherein the serving beam is selected in consideration of an elevation angle depending on movement of the satellite, and wherein N is a first frequency, and M is a second frequency.

6. The method of claim 1, wherein the determining the size of the coverage of the beam comprises:

determining a maximum residual Doppler value based on an orbit or an altitude of the satellite and a carrier frequency of a signal transmitted through the beam; and determining a size of the coverage based on the maximum residual Doppler value and the a subcarrier spacing of the signal.

7. The method of claim 6, further comprising:

checking a parameter indicating the subcarrier spacing included in a master information block (MIB) transmitted from the satellite; and checking the subcarrier spacing based on the parameter.

8. The method of claim 7, wherein the checking the subcarrier spacing comprises interpreting the parameter based on a frequency range (FR) to which a frequency at which a parameter indicating the subcarrier spacing is received belongs.

9. The method of claim 6, further comprising checking a parameter indicating the carrier frequency included in system information related to the satellite.

10. The method of claim 1, further comprising estimating a location of the beam center or the first distance between the UE and the beam center based on information obtained through system information.

11. The method of claim 1, further comprising checking information about a location of the beam center included in a system information block including auxiliary information for NTN access.

12. The method of claim 1, wherein the selecting the serving beam comprises selecting a beam carrying the first information and the second information as the serving beam, based on the first distance being equal to or less than a size of the coverage.

13. The method of claim 1, wherein the determining the coverage of the beam comprises:

determining a first beam size considering a differential delay based on a first information set obtained based on system information;

determining a second beam size considering a Doppler shift based on a second information set obtained based on the system information; and determining a size of the coverage of a beam used in the satellite communication based on the smaller of the first beam size and the second beam size.

14. The method of claim 13, wherein the first information set comprises at least one of a minimum elevation angle, preamble information, a subcarrier spacing or an altitude of the satellite, and wherein the second information set comprises at least one of a carrier frequency of a signal transmitted through the beam, the subcarrier spacing, a maximum elevation angle or the altitude of the satellite.

15. The method of claim 13, wherein the differential delay is limited based on at least one of a maximum random access distance or a maximum timing advance distance.

16. The method of claim 13, wherein the first beam size is determined based on a maximum random access distance calculated using random access preamble information.

17. The method of claim 13, wherein the first information set comprises a minimum elevation angle, and wherein the minimum elevation angle comprises a predefined value.

18. The method of claim 13, wherein the second information set comprises a maximum elevation angle, and wherein the maximum elevation angle comprises auxiliary information for NTN access.

19. A user equipment (UE) in a wireless communication system, the UE comprises:

a transceiver; and at least one processor connected to the transceiver, wherein the at least one processor is configured to:

receive first information about an elevation angle for supporting satellite communication and second information about a beam center;

determine coverage of a beam based on the first information and the second information;

determine a first distance between the UE and the beam center based on the second information; and select a serving beam for the UE based on the coverage of the beam and the first distance, wherein the coverage of the beam is determined based on change characteristics of a residual Doppler value remaining after compensation based on the beam center, depending on a second distance from the beam center.

* * * * *